United States Patent
Bolt

(10) Patent No.: US 6,766,412 B2
(45) Date of Patent: Jul. 20, 2004

(54) DATA STORAGE MEDIA LIBRARY WITH SCALABLE THROUGHPUT RATE FOR DATA ROUTING AND PROTOCOL CONVERSION

(75) Inventor: Thomas Bolt, Encinitas, CA (US)

(73) Assignee: Quantum Corporation, San Jose, CA (US)

( * ) Notice: Subject to any disclaimer, the term of this patent is extended or adjusted under 35 U.S.C. 154(b) by 294 days.

(21) Appl. No.: 09/823,859

(22) Filed: Mar. 31, 2001

(65) Prior Publication Data

US 2002/0144048 A1 Oct. 3, 2002

(51) Int. Cl.$^7$ .......................... G06F 12/00; G11B 20/00
(52) U.S. Cl. ..................................... 711/111; 369/34.01
(58) Field of Search ........................... 369/30.06, 30.38, 369/32.01, 33.01, 34.01; 710/305, 312, 315; 711/111, 112, 114, 4

(56) References Cited

U.S. PATENT DOCUMENTS

| | | | |
|---|---|---|---|
| 5,231,552 A | | 7/1993 | Schneider et al. ............. 360/92 |
| 5,236,296 A | | 8/1993 | Ostwald ..................... 414/280 |
| 5,504,873 A | * | 4/1996 | Martin et al. ................ 711/111 |
| 5,694,615 A | | 12/1997 | Thapar et al. ................. 710/2 |
| 5,802,278 A | | 9/1998 | Isfeld et al. ................ 709/249 |
| 5,812,754 A | | 9/1998 | Lui et al. ....................... 714/6 |
| 5,883,864 A | | 3/1999 | Saliba ......................... 360/92 |
| 5,925,119 A | | 7/1999 | Maroney .................... 710/315 |
| 5,935,205 A | | 8/1999 | Murayama et al. ......... 709/216 |
| 5,941,972 A | | 8/1999 | Hoese et al. ................ 710/315 |
| 5,954,796 A | | 9/1999 | McCarty et al. ............. 709/222 |
| 5,959,994 A | | 9/1999 | Boggs et al. ................ 370/399 |
| 6,000,020 A | | 12/1999 | Chin et al. ................... 711/162 |
| 6,011,803 A | | 1/2000 | Bicknell et al. ............. 370/467 |
| 6,031,798 A | * | 2/2000 | James et al. ............. 369/30.28 |
| 6,237,063 B1 | * | 5/2001 | Bachmat et al. ............. 711/114 |
| 6,328,766 B1 | * | 12/2001 | Long .............................. 718/8 |
| 6,487,474 B1 | * | 11/2002 | Goodman et al. .......... 700/245 |
| 6,507,889 B1 | * | 1/2003 | Tsurumaki et al. ......... 711/112 |

* cited by examiner

*Primary Examiner*—Gary Portka
(74) *Attorney, Agent, or Firm*—Michael Zarrabian

(57) ABSTRACT

A digital data storage unit, such as tape library, has a multiplicity of storage media slots, each storage media slot for receiving a storage media unit, a plurality of storage media units loaded in particular ones of the storage media slots, a plurality of data transfer devices for writing data to and reading data from the storage media units, a plurality of data transfer device interfaces corresponding to the plurality of the data transfer devices, each data transfer device interface configured for transferring data between a corresponding data transfer device and a host computing environment, a loader mechanism for selectively moving a storage media unit between a storage media slot and one of the plurality of data storage drives, and a storage unit controller connected to the loader mechanism and to the data transfer device interfaces, wherein the storage unit controller is configured for connection to the host computing environment to receive and decode one or more host commands sent by the host computing environment at the storage unit controller, and for controlling the loader mechanism for selectively moving storage media units from the storage media slot locations to the data transfer devices for data transfer in response to host commands.

93 Claims, 12 Drawing Sheets

DATA STORAGE MEDIA LIBRARY WITH SCALABLE THROUGHPUT RATE FOR DATA ROUTING AND PROTOCOL CONVERSION

FIELD OF THE INVENTION

The present invention relates to data storage media libraries, and more particularly, to scalable digital data storage media libraries.

BACKGROUND OF THE INVENTION

Digital data storage devices are utilized for storing information for use by data processing systems including computer systems. One commonly used data storage medium is tape storage, used in tape libraries, well suited for backup operations as well as for providing archival and retrieval operations for vast quantities of information content. In this regard, optical storage is also known for voluminous content storage and retrieval.

Tape libraries are known in the art. One example of a tape library is provided by the Ostwald U.S. Pat. No. 5,236,296. In that patent, a tape library is described in FIG. 8 as comprising a vast, semi-cylindrical array of tape cartridge storage slots aligned generally along a fixed radius of curvature. A central cartridge inventory is maintained by a library controller, so that logical requests for a particular drive and cartridge may be translated by the library controller into physical device locations and electromechanical operations. In this prior example, a media loader includes a robotic arm rotating at a focus of the cylindrical segment that is elevated and rotated to a particular cartridge storage slot. A picker-gripper mechanism of the arm then "picks" and "grips" the cartridge stored in the slot and moves the cartridge out of the slot and into a temporary transport slot of the arm. The robotic arm is then commanded to perform a second rotation/elevation operation in order to present the retrieved tape cartridge to a loading tray of the selected tape drive, and the drive then loads the cartridge and threads the tape for recording/playback operations, following initial setup and calibration routines conventional with tape drives. The drive may be one of several drives accessible by the robotic arm.

Typically, media loaders (e.g., tape cartridge loader) operate in accordance with a standardized command structure. One such command structure is found in the Small Computer System Interface-2 draft standard X3T9.2 Project 375D (ANSI X3.131-199X). In this particular industry specification, a medium changer device includes a medium transport element, at least one storage element, and a data transfer element. An import/export element may also be supported. A storage element is identified as a storage slot for storing a standard medium unit, such as a disk or a tape cartridge. In order to access data on a standard medium unit, a host system issues commands to both the medium loader and to the drive.

The commands to the loader may include "move medium"; or, "exchange medium" and "read element status". Commands directed by the host to the drive may include "test unit ready", "inquiry", "start-stop" and "load-unload" commands, in addition to the obvious "read/write" commands. One important characteristic about this command structure is that the logical address of the drive is supplied to the media loader as a destination, as well as to the drive itself for subsequent read or write operations from or to the selected and automatically loaded medium unit.

Individually, the data throughput rates of typical open systems tape drives range between 5 and 15 megabytes per second, and these throughput rates are increasing with new versions of tape drives. This data rate must be effectively doubled internally by a data route or bridge between the tape drives and the host system, which must simultaneously receive data from the host system and send data to the target tape drives. At a tape library system level, such throughput requirements must then be multiplied by the number of tape drives in the library to represent the aggregate data rate for the library system. This places internal throughput requirements on tape libraries at over e.g. 320 Bytes/second.

Further, advanced data transfer functionality in libraries can double the aggregate throughput requirements. And, future generations of tape drives will require two to four times the current bandwidth of individual tape drives. As such, current and future libraries have high internal aggregate bandwidth requirements (e.g. over a gigabyte/second) at the system level for data transfer between the tape drives in the library and host computers.

In conventional libraries, several tape drives are connected to a high bandwidth bridge for data transfer between the tape drives and the host computers. Such libraries have several shortcomings. For example, high bandwidth bridges capable of handling aggregate data transfer between several tape drives and host computers are required. Such high bandwidth bridges are complex and expensive. As the number of tape drives per bridge increases, and as the tape drive data transfer rates increase, more complex and expensive bridges with higher bandwidth are required to replace existing bridges. This has led to low reusability between library families, low fault tolerance because a bridge failure effectively renders all the tape drives connected to the bridge unusable, and rapid obsolescence with the introduction of later generations of tape drives with higher throughput. Further, due to the extreme data rates necessary in such conventional libraries, very expensive electronics and processors are utilized to perform generalized data processing in the library. As a result, due to high throughout demands, typically bridge devices in conventional libraries perform minimal or no data processing.

Conventional library Fibre Channel and bridge implementations are either one Fiber Channel interface to several SCSI bus interfaces, or several Fibre Channel interfaces to several SCSI bus interfaces in configuration. Also, conventional libraries are limited in their protocol conversions to encapsulation/de-encapsulation, such as encapsulating SCSI protocol within Fibre Channel Protocol. Although there may be several bridges present in such libraries, each bridge services several tape drives. Because most libraries allow incremental single tape drive additions, the design of the bridges dictates that the natural increment for bridges is not the same as that for tape drives (for example, if each bridge services 8 tape drives, a library system containing 10 tape drives must have two bridges, and the bridging capacity for 6 tape drives is wasted).

There is, therefore, a need for a data storage unit such a media library which provides high data throughput capability, and reliable and fail safe architecture, for overcoming significant limitations and drawbacks associated with the conventional media libraries.

BRIEF SUMMARY OF THE INVENTION

The present invention alleviates the aforementioned shortcomings of conventional libraries. In one embodiment the present invention provides a digital data storage unit, such as tape library, comprising a multiplicity of storage media slots, each storage media slot for receiving a storage media unit, a plurality of storage media units loaded in particular ones of the storage media slots, a plurality of data transfer devices for writing data to and reading data from the storage media units, a plurality of data transfer device interfaces corresponding to the plurality of the data transfer devices, each data transfer device interface configured for transferring data between a corresponding data transfer device and a host computing environment, a loader mechanism for selectively moving a storage media unit between a storage media slot and one of the plurality of data storage drives, and a storage unit controller connected to the loader mechanism and to the data transfer device interfaces, wherein the storage unit controller is configured for connection to the host computing environment to receive and decode one or more host commands sent by the host computing environment at the storage unit controller, and for controlling the loader mechanism for selectively moving storage media units from the storage media slot locations to the data transfer devices for data transfer in response to host commands.

A digital data storage unit according to the present invention alleviates prior art shortcomings in handling the aggregate throughput rates of large libraries with respect to data routing and protocol conversion. As such, in one version, inexpensive/commodity components can be used for the data transfer device interfaces in a library system according to the present invention, because each data transfer device interface addresses only the bandwidth requirements of a single data transfer device. This approach allows the same data transfer device interface to be used by any data storage library, because the data transfer device interface can be embedded in a data transfer device canister. Further, a high level of redundancy is achieved wherein failure of a single data transfer device interface only affects a minimum number of data transfer devices. And, each data transfer device interface has excess processing bandwidth to accommodate higher data transfer requirements such for data mirroring and group parity such as tape parity groups.

By applying the principals of the present invention including distributed processing to the tasks of data routing and protocol conversion, a highly scalable digital data storage unit is provided using commodity parts while achieving high degrees of redundancy and fault tolerance. In one version, tape library system, and method of operating the same, according to the present invention provide a single data routing and protocol conversion solution that scales linearly with the number of tape drives in the library system, capable of handling the bandwidth requirements of high data rate tape devices. The present invention is useful for data storage libraries including tape drives, magnetic disk drives, optical disk drives or other storage devices.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
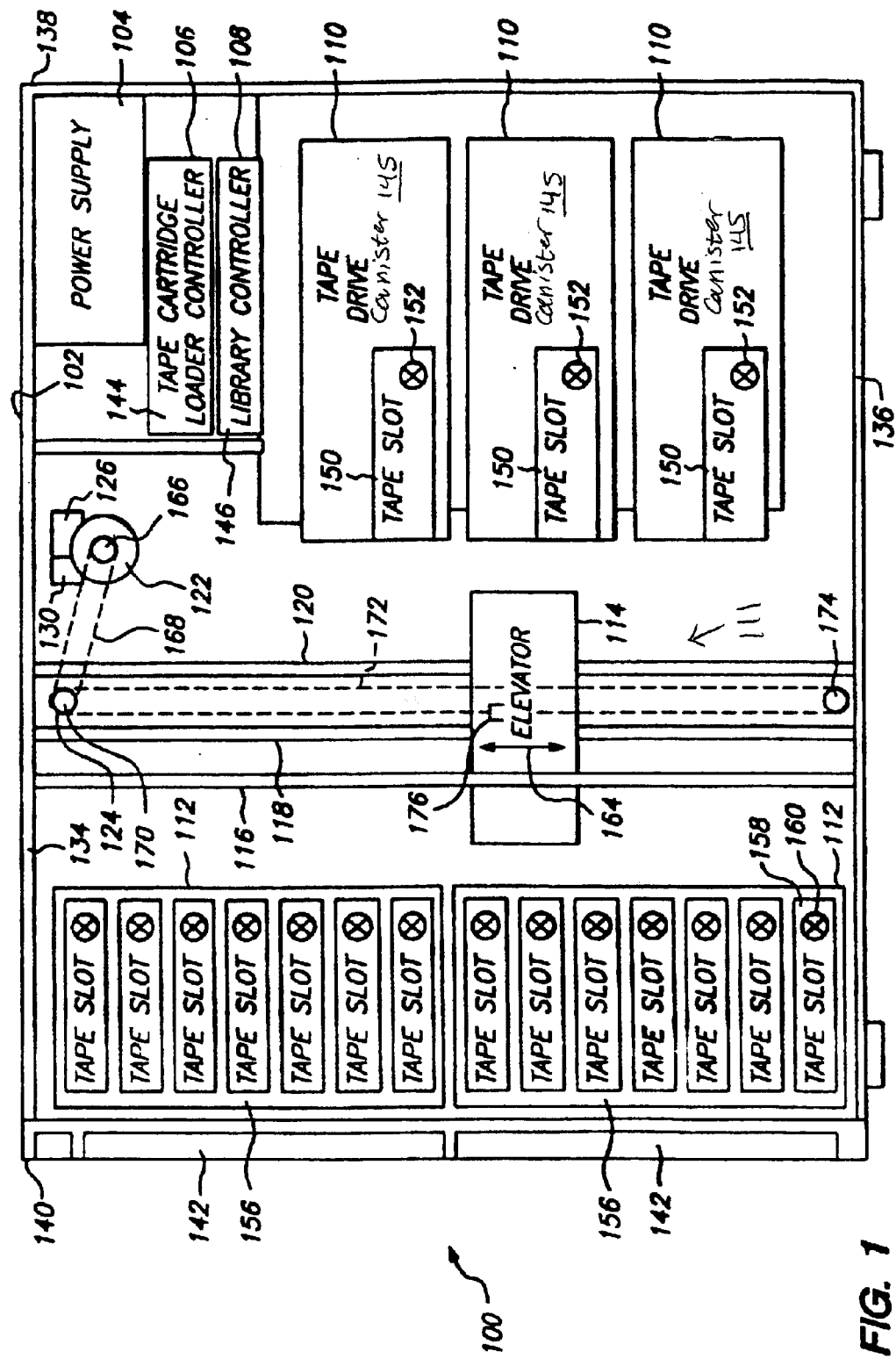
FIG. 1 is a block diagram of an example multi-cartridge tape library/loader system in which an embodiment of the present invention is implemented.

Referring to FIG. 1, there is shown a block diagram an embodiment of a digital data storage unit in the form of a multi-drive, multi-magazine mass storage and retrieval tape library/loader unit 100 for tape cartridges in which the present invention can be implemented. Though an example tape library 100 according to aspects of the present invention is described herein, it is to be understood that the present invention is equally application to other data storage libraries such as optical disk libraries, etc.

The library unit 100 includes a housing 102, a power supply 104, a tape cartridge loader controller slot 106, a library controller slot 108, a plurality of tape drive canister slots 110, a plurality of tape cartridge magazine slots 112, a robot/picker mechanism 111 including a tape cartridge pass-through elevator 114, at least one tape cartridge elevator guide shaft 116, a drive shaft 118, a rack drive shaft 120, a tape cartridge elevator motor 122, a pulley drive assembly 124, a roller drive shaft motor 26, and, a rack drive shaft motor 130.

The housing 102 may be substantially rectangular or square in cross section and includes a top side wall 134, a bottom side wall 136, a rear wall 138, and a front panel 140. The front panel 140 includes a plurality of access doors 142 pivotally mounted onto the front 140 opposite the tape cartridge magazine slots 112 that permit manual loading and unloading of tape cartridges by an operator into the tape cartridge magazines within the mass storage and retrieval unit 100. The housing 102 may be constructed of any number of conventional materials such as, for example, those utilized in industry standard rack mount cabinets.

The power supply 104 may be positioned in a rear corner of the housing 102 adjacent to the tape cartridge loader controller slot 106 and library controller slot 108. The power supply 104 provides electrical power in a well known manner to the tape cartridge loader controller slot 106, library controller slot 108, the plurality of tape drive canister slots 110, tape cartridge elevator motor 122, roller drive shaft motor 126, and rack drive shaft motor 130. The power supply 104 is interfaced with these components as well as with an external power source in a well known manner using industry standard cabling and connections.

Figure 2A:
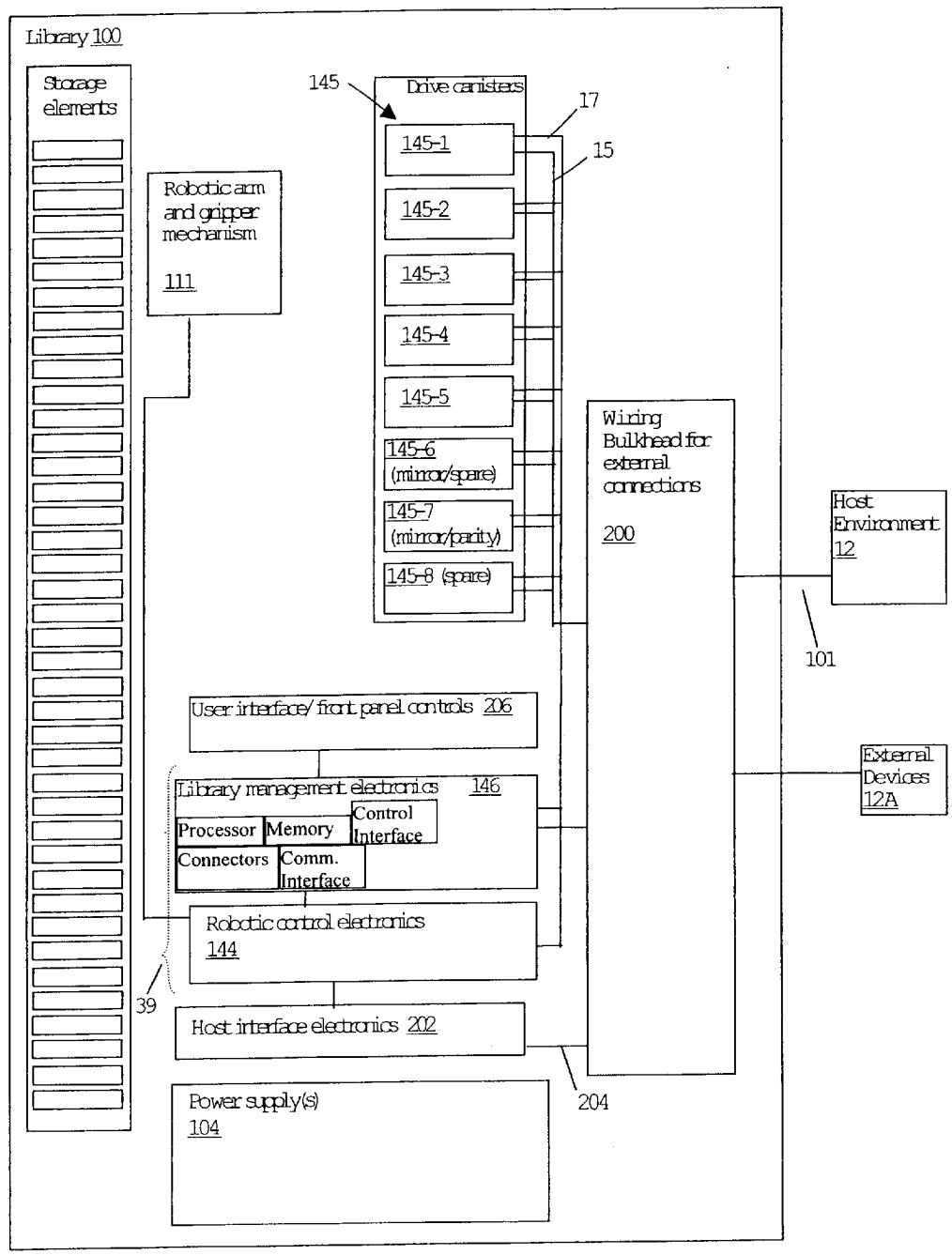
FIG. 2A is an example block diagram of an embodiment the library of FIG. 1 connected to a host environment via a communication link.
Figure 2B:
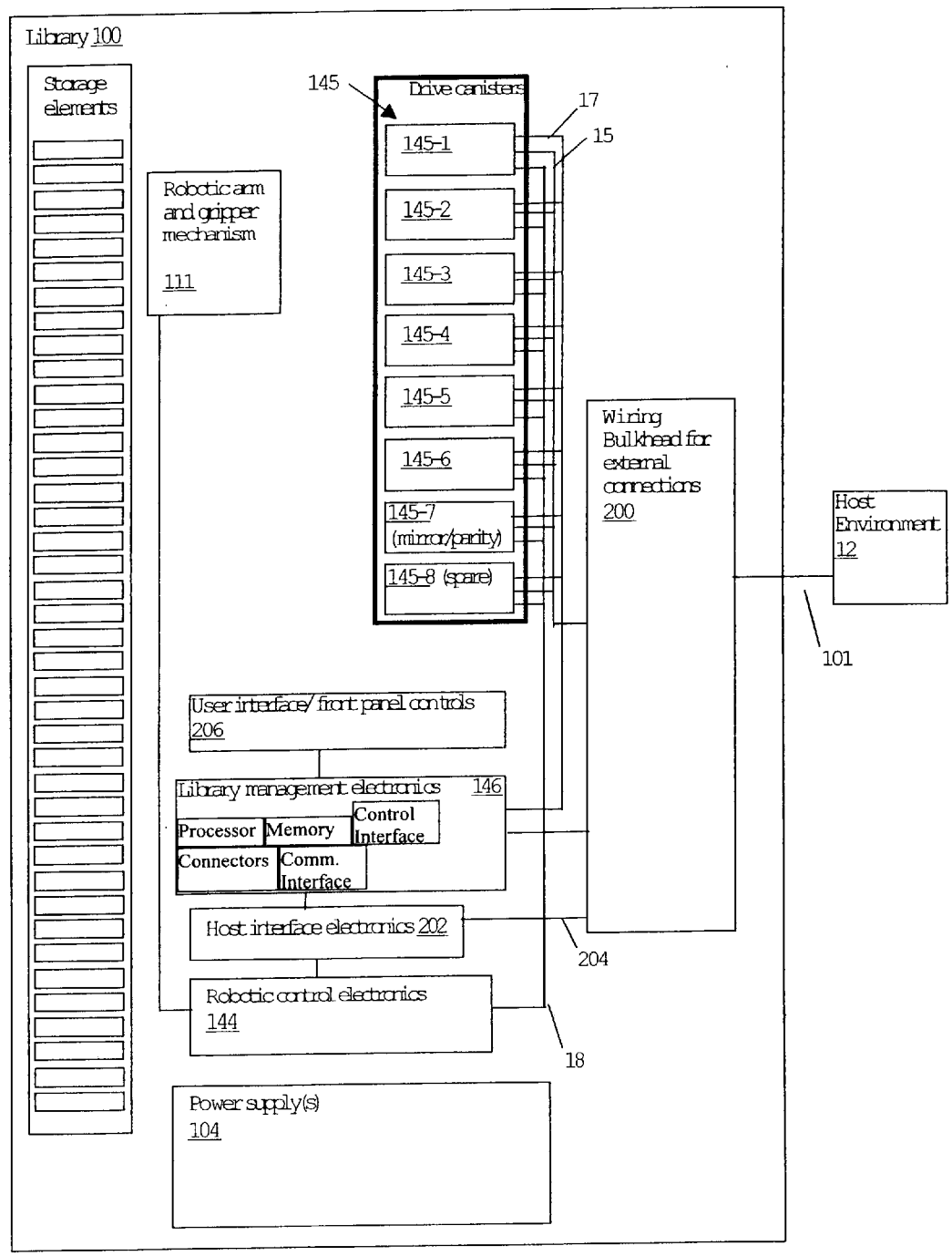
FIG. 2B is another example block diagram of an embodiment the library of FIG. 1 connected to a host environment via a communication link.

FIGS. 2A–B show example block diagrams of two embodiments of the library 100 of FIG. 1 connected to the host environment 12 via a communication link 101. Referring to FIGS. 2A–B in conjunction with FIG. 1, the unit 100 further includes a storage unit controller 39 comprising a tape cartridge loader robotic controller 144 and a library storage/management controller 146. The tape cartridge loader controller slot 106 receives the tape cartridge loader controller 144, and the library controller slot 108 receives the library controller 146. In one embodiment, the tape cartridge loader controller 144 may comprise e.g. a standard driver interface unit for receiving digital commands and translating the commands into driving currents, such as step pulses for controlling stepper motors. In one embodiment, the library controller 146 may comprise e.g. a standard programmable general purpose computer formed on a single plug-in card unit and preferably includes a programmed microprocessor or microcontroller according to the present invention, memory, communication interface, control interface, connectors, etc. At least one input-output connection 17 between the tape cartridge loader controller 144, the library controller 146 and the other components of the unit 100 may comprise well known industry standard cabling and communication protocols. For example, several implementations use common industry standards such as the i2c bus, RS422 or RS232, Ethernet, Etc. Cabling and electrical characteristics including signaling protocols can be generally standardized, and the logical message protocols can be either proprietary or standardized as known to those skilled in the art.

Alternatively, the loader controller 144 may be included as circuitry within or on the library controller card 146. The mass storage and retrieval unit 100 may be operated by means of the cartridge loader controller 144 and library controller 146 for use in conventional data processing. Connections of the unit 100 to conventional bus structures are shown in FIGS. 2–3 and discussed hereinafter.

Each of the tape drive slots 110 receives a drive canister 145 wherein each canister 145 includes a data transfer device 148 such as a standard tape drive (e.g., Quantum DLT2000XT (TM), DLT4000 (TM), DLT7000 (TM), DLT8000(TM), SuperDLT (TM) cartridge tape drive, or equivalent) which has been adapted to fit into the canister 145. Hereinafter data transfer device and tape drive are used interchangably (shown by reference 148 in the drawings), and it is to be understood that the data transfer device 148 can comprise other devices such as optical disk drive, etc. FIG. 1 shows several example canisters 145, designated as 145-1, 145-2, 145-3, Etc. in FIGS. 2A–B. As shown by example in FIGS. 3A–D, each canister 145 further includes a device data transfer interface 25 for e.g. transferring data between the data transfer device (e.g., tape drive 148) in that canister 145 and the host computing environment 12. In one example, the host environment 12 can comprise one or more computer systems, data processing systems, routers, networks, etc.

Figure 3A:
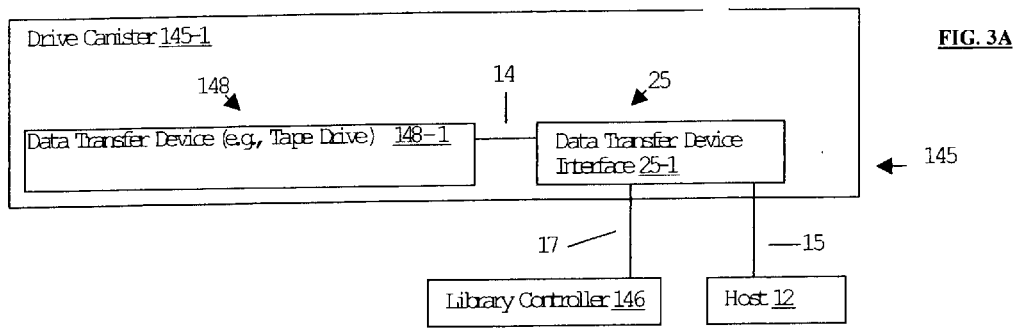
FIGS. 3A–C show example block diagrams of several drive canisters of FIG. 2A, each canister including a data transfer device such as a tape drive and corresponding data transfer device interface such as a microbridge according to the present invention.
Figure 3B:
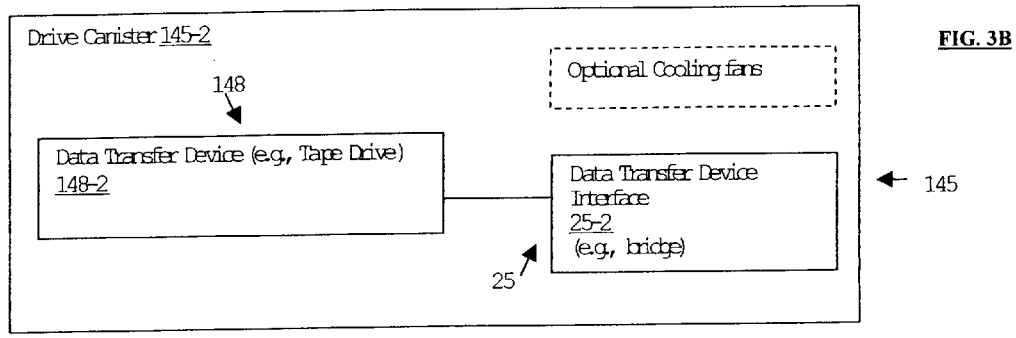
Figure 3C:
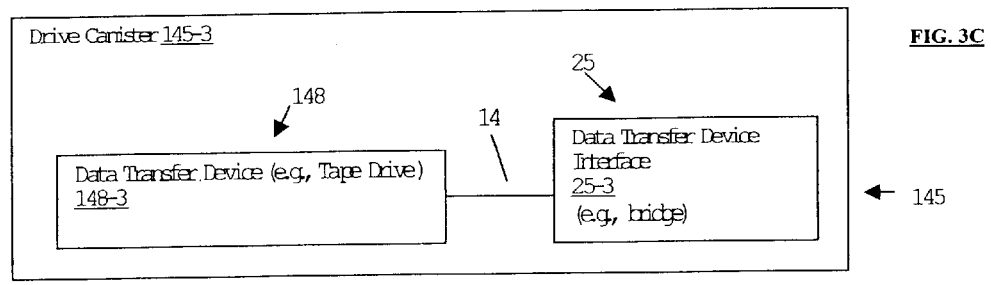
Figure 3D:
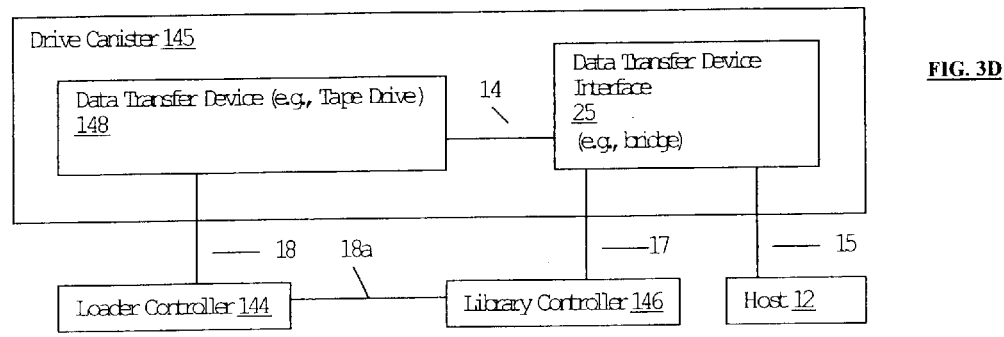
FIG. 3D shows an example block diagram of one of several a drive canisters of FIG. 2B, each canister including a data transfer device such as a tape drive and corresponding data transfer device interface such as a microbridge according to the present invention.

In the example of FIG. 2A, the library controller 146 and the loader controller 144 are connected to the device data transfer interface 25 for each data transfer device 148 via a communication link 17 (e.g., Ethernet connection). As shown in FIGS. 3A–C the canister 145-1 includes a data transfer device 148, designated as tape drive 148-1, and a device data transfer interface 25, designated as device data transfer interface (e.g., microbridge) 25-1. Similarly, the canister 145-2 includes a data transfer device 148, designated as tape drive 148-2, and a device data transfer interface 25, designated as device data transfer interface 25-2. And, the canister 145-3 includes a data transfer device 148, designated as tape drive 148-3, and a device data transfer interface 25, designated as device data transfer interface 25-3. In the example of FIG. 2B, for each data transfer device 148 (e.g., tape drives 148-1, 148-2, etc.) there is a communication link 17 between the library controller 146 and the device data transfer interface 25 for the tape drive 148, and a communication link 18 (e.g., RS422) between the loader controller 144 and the tape drive 148, shown in more detail in FIG. 3D. The communication link 17 can comprise Ethernet, i2c, USB, etc. Another communication link 18a (e.g., SCSI bus) connects the library controller 146 and the loader controller 144 for communication and control therebetween, as shown in FIG. 3D.

Each tape drive 148 includes a tape cartridge slot 150 and a tape cartridge sensor 152 within the slot 150 which generates a tape cartridge presence signal. A stand-alone tape drive 148 may be adapted for use in the mass storage and retrieval unit 100 by removing the handle at the front of the tape drive 148, removing the bezel from the front of the drive 148, and installing the tape drive 148 onto a conventional mounting bracket that supports the tape drive 148 within the housing 102 and provides adequate alignment of the tape drive 148 relative to the other components of the unit 100. The tape drive 148 further includes a handle motor assembly and handle actuator and transmission to provide automatic actuation of the tape drive door under the control of the tape cartridge loader controller 144 and/or library controller 146. The handle motor assembly may comprise a stepper motor or DC servo motor. The handle actuator and transmission may comprise any conventional transmission for converting rotation of the output shaft of the assembly into rotation and translation of the tape drive door.

Each of the tape cartridge magazine slots 112 receives a standard tape cartridge magazine 156 such as, for example, a Quantum TK85-M seven cartridge magazine adapted for use in the mass storage and retrieval unit 100. This cartridge is shown, for example, in U.S. Pat. No. 5,231,552 entitled: "Magazine and Receiver for Media Cartridge Loader", the disclosure thereof being incorporated herein by reference. The tape cartridge magazine 156 includes one or more tape cartridge slots 158, a tape cartridge presence flag 160 within each slot 158 which provides an indication of the presence or absence of a tape cartridge, and a release lever 162 for each slot 158. The standard tape cartridge magazine 156 as described in U.S. Pat. No. 5,231,552 may be adapted by removing the handle from the top of the magazine 156, adding a handle to the side, and modifying the lever lock by adding a one-way spring gate to force the guide pin to follow the proper path and thereby prevent incorrect manual operation when the magazine 156 is laid on its side.

As shown in FIG. 1, the tape cartridge elevator 114 is positioned within the housing 102 between the plurality of tape drive cartridge slots 150 and the plurality of tape cartridge magazine slots 112. In this manner, the tape cartridge elevator 114 is able to load and unload tape cartridges to and from all of the tape drives 148 and tape cartridge magazines 156. The tape cartridge elevator 114 is actuated in the directions indicated by the arrows 164 by the tape cartridge elevator motor 122 and pulley drive assembly 124 under the control of the tape cartridge loader controller 144 and library controller 146. The pulley drive assembly 124 includes a cartridge drive motor pulley 166, a short drive belt 168, an elevator drive pulley 170, a long drive belt 172, and an elevator idler pulley 174. The tape cartridge elevator 114 is slidably mounted upon at least one tape cartridge elevator guide shaft 116 and removably attached to the long drive belt 172 of the pulley drive assembly 124 at a connection point 176. The tape cartridge drive motor pulley 166 is rigidly attached to the output shaft of the tape cartridge drive motor 122. The elevator drive pulley 170 and the elevator idler pulley 174 are rotatably supported by the left and right side walls of the housing 102. The short drive belt 168 is mounted on and between the tape cartridge drive motor pulley 166 and the elevator drive pulley 170 while the long drive belt 172 is mounted on and between the elevator drive pulley 170 and the elevator idler pulley 174.

Under the control of the tape cartridge loader controller 144 and library controller 146, the tape cartridge elevator motor 122 rotates the tape cartridge drive motor pulley 166. Rotation of the tape cartridge drive motor pulley 166 in turn rotates the elevator drive pulley 170. Rotation of the elevator drive pulley 170 in turn causes the long drive belt 172 to move about the elevator drive pulley 170 and the elevator idler pulley 174. As a result of this arrangement, the tape cartridge elevator 114 translates in the direction indicated by the arrows 164 when the tape cartridge elevator motor 122 is rotated under the control of the tape cartridge loader controller 144 and library controller 146 by virtue of the connection 176 with the long drive belt 172.

The tape cartridge elevator motor 122 may comprise any controllably positionable motor such as, for example, a stepper motor, a servo motor, or a DC motor. The pulley drive assembly 124, which converts rotation of the output drive shaft of the tape cartridge elevator motor 122 into translation of the tape cartridge elevator 114, may be replaced with equivalent means such as, for example, a lead screw driven directly by the tape cartridge elevator motor 122 with the tape cartridge elevator 114 including a suitable connection threadadly mounted onto the lead screw, or alternatively, the elevator drive pulley 170 may be driven directly from the output shaft of the tape cartridge elevator motor 122 thereby eliminating the need for the short drive belt 168. Other similar alternative means for converting a rotational input into a translational output may also be used in the present embodiment.

The roller drive shaft 118 is rotatably supported at opposite ends by the top side wall 134 and bottom side wall 136 of the housing 102. The roller drive shaft 118 further passes through and is operably coupled to the tape cartridge elevator 114. The roller drive shaft 118 is rotated by the roller drive shaft motor 126 and roller drive shaft coupling assembly under the control of the tape cartridge loader controller 144 and library controller 146. The roller drive shaft coupling assembly driven by motor 126 may comprise any conventional transmission for coupling a rotary input to a rotary output which may include belts and pulleys, a gear train, or some combination of both.

The rack drive shaft 120 is rotatably supported at opposite ends by the top side wall 134 and bottom side wall 136 of the housing 102. The rack drive shaft 118 further passes through, and is operably coupled to, the tape cartridge elevator 114. The rack drive shaft 120 is rotated by the rack drive shaft motor 130 and a rack drive shaft coupling assembly coupled to the motor 130 which operates under the control of the tape cartridge loader controller 144 and library controller 146. The rack drive shaft coupling assembly driven by motor 130 may comprise any conventional transmission for coupling a rotary input to a rotary output which may include belts and pulleys, a gear train, or some combination of both. The roller drive shaft motor 126 and rack drive shaft motor 130 may comprise any controllably positionable electric motor such as, for example, a stepper motor, a servo motor, or a DC motor. In a one embodiment, the roller drive shaft motor 126 and rack drive shaft motor 130 are stepper motors and are further positioned immediately adjacent one another.

Figure 4A:
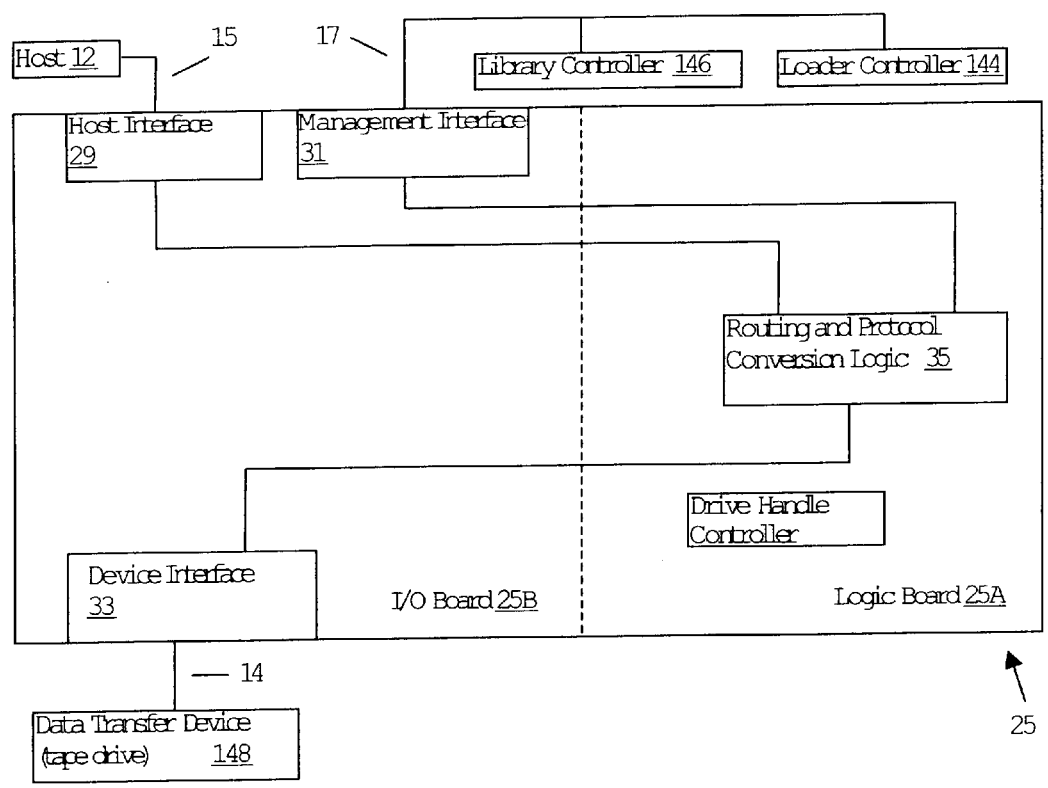
FIG. 4A is an example block diagram of an embodiment of a data transfer device interface such as microbridges of FIGS. 3A–C.

FIG. 4A is an example block diagram of an embodiment of a data transfer device interface 25 (e.g., microbridges) of FIGS. 2A and 3A–C. In the description herein data transfer device interface and microbridge are user interchangably, and it is to be understood that other data transfer device interfaces are also possible and contemplated by the present invention.

Referring to FIG. 4A, in one example, each of one or more data transfer device interfaces 25 includes: a host interface 29, a management interface 31, a device data interface 33, and routing and protocol conversion logic 35, interconnected as shown. The host interface 29 is for connecting the data transfer device interface 25 to the host environment 12 via a communication link 15 for data flow between the host environment 12 and the data transfer device interface 25. The device data interface 33 is for connecting the data transfer device interface 25 to a corresponding data transfer device 148 via a communication link 14 for data flow between the data transfer device interface 25 and the data transfer device 148. The routing and protocol conversion logic 35 is for processing including e.g. protocol conversion such as from SCSI-3 over Fiber Channel Protocol to SCSI-2 over parallel SCSI, data stream splitting or data duplication for tape mirroring and Tape Group Parity applications, data stream routing/forwarding for drive fail-over applications, parity calculations and management for Tape Group Parity applications, NDMP services and protocol conversion between NDMP API and parallel SCSI commands, etc. The management interface 31 is for connecting the data transfer device interface 25 to the library controller 146 via a communication link 17, allowing the library controller 146 to configure and control data transfer and data flow in the data transfer device interface 25. As such, each data transfer device 25 provides functionality such as data transfer between the corresponding data transfer device 148 and the host environment 12.

In one example embodiment, a data transfer device interface 25 can comprise two printed circuit boards which are sandwiched together. One board (e.g., logic board 25A) includes the core processing logic 35, and the second board (e.g., I/O board 25B) includes the I/O interfaces 29, 31, 33 which determine characteristics of the interface with the host environment 12 and the corresponding drive 148. As such, the I/O board 25B can have different embodiments to achieve the desired interconnects with the corresponding drive 148 and host environment 12. Other configurations and embodiments for the data transfer device interface 25 are possible, and contemplated by the present invention.

Each data transfer device interface 25 can be configured and connected to the host environment 12 via a communication link 15 such as e.g. Ethernet, Fibre Channel, Infiniband, Etc. For example, a first data transfer device interface 25-1 can be connected to the host environment 12 via an Ethernet connection, while a second data transfer device interface 25-2 can be connected to the host environment 12 via a Fibre Channel connection. Further, third and fourth data transfer device interfaces 25-3, 25-4 can be connected to the host environment 12 via Infiniband connections. As such, different types of data transfer device interfaces can be utilized to handle different host environment interfaces.

As shown in FIGS. 2A and 4A, a communication link 17 connects the tape drive 148 and the data transfer device interface 25 in each canister 145, to the library controller 146 and the loader/robotic controller 144. For example, the communication link 17 allows communication and control between the library controller 146 and the data transfer device interface 25. In one version, control software can reside in the library controller 146 for download to the data transfer device interface 25 via the link 17. Such a feature allows all the data transfer device interfaces 25 and corresponding data transfer devices 148 to be upgraded simultaneously, and different software applications to be downloaded to different data transfer device interfaces 25 and data transfer devices 148 for compatible hardware. For example, both iSCSI and NDMP protocols expose a host interface over Ethernet, wherein the exact same data transfer device interface 25 can be used to implement either functionality set, and different devices within the same library can execute different applications (e.g., a fibre channel protocol (FCP) to SCSI translation code can be downloaded to a data transfer device interface 25 including a physical Fibre Channel interface). Furthermore, the user can reconfigure that arrangement at any time.

As such, in one case, NDMP and iSCSI can operate on different device interfaces 25 and/or corresponding tape drives 148 (having identical or different hardware implementations) within the same library 100, wherein different software applications are downloaded to different data transfer device interfaces 25 based on user configuration, such as via the user interface 206. The link 17 can also be used to set user configurations for each individual data transfer device interface 25 and/or corresponding tape drive 148, comprising e.g. Fibre Channel address, TCP/IP address, etc. depending on the application. During routine operation, the link 17 is also used to send status/heartbeat messages and temperature statistics to the library controller 146 for monitoring. Similarly, the loader controller 144 utilizes the link 17 to command the tape drives 148 to load/unload tape cartridges and perform other functions such as motor control for a motor that ejects tapes. For example, the loader controller 144 can use the link 17 to send commands to each tape drive 148 via a corresponding data transfer device interface 25, to e.g. physically eject a tape from the tape drive 148 prior to attempting o move the tape from the tape drive 148 to a storage slot. Such commands can include e.g. motor control commands or software commands to a small electric motor which operates the tape ejection handle. The link 17 can comprise e.g. Ethernet, i2c, USB, etc. The link 17 can also be used to perform tasks such as setting the Fibre Channel ID, or Ethernet address of tape drives 148. As such, the link 17 connecting the robotic control electronics 144 and the library management/controller electronics 146 to the drive canister 145, is the library interface to each tape drive 148. A Fibre Channel version of the link 17 is also possible. For the functions of ejecting tapes and setting SCSI IDs on the tape drives, the use of link 17 can replace link 18.

The communication link 15 connecting to the bulkhead 200 is the host interface connection for the tape drive 148. The link 15 can comprise a SCSI cable, Fibre Channel cable, Ethernet, Infiniband cables, etc. The link 15 is the main data path between the host environment 12 and the tape drives 148. The bulkhead 200 includes termination points for all of the internal cabling that are ultimately connected to external devices (e.g., host 12, networks, etc.). The bulkhead 200 can include the SCSI/Ethernet/Fibre Channel/Infiniband connectors that a user plugs cables into, for connection to e.g. the host 12.

The library controller 146 is connected to the bulkhead 200 for external connections to external devices such as e.g. for SNMP and/or web server interfaces 12A. Further, the library 100 includes host interfaces electronics 202 as interface for connecting the robotic controller 144 to the host 12 through a communication link 204 (e.g., via the bulkhead 200), by which the host 12 interacts with the robotic controller 144. The host interface electronics 202 can comprise Ethernet, SCSI, Fibre Channel, Infiniband, etc., and provides electrical interface to the robotic controller 144. Depending upon implementation, the host interface electronics 202 can comprise e.g. SCSI adapter card, an Ethernet Network Interface Card, an Infiniband HBA, a Fibre Channel interface card, etc.

In one embodiment of the library 100, each data transfer device interface 25 comprises a "microbridge". Each tape drive 148 can be connected to a corresponding microbridge 25 using e.g. SCSI, Fiber Channel, or proprietary interface. As such there can be different embodiments of the microbridge 25 to handle the different tape drive interface types. A fiber channel drive interface provides re-routing of host commands, in case the corresponding tape drive fails, and communication conversion from another type of host connection (such as Ethernet). For Ethernet, the microbridge 25 is responsible for protocol conversion to either ISCSI (a standard for encapsulating SCSI over TCP/IP), NDMP (Network Data Management Protocol), or other protocols. An example of a proprietary interface can be the internal bus of a SuperDLT(TM) tape drive manufactured by Quantum Corp. (TM). The SuperDLT (SDLT) tape drive has a modular design which allows either a SCSI or Fibre Channel interface adapter to be fitted to the tape drive. The microbridge 25 can also interface directly with said internal bus, obviating the need for the Fibre Channel or SCSI interface logic on both the tape drive and the microbridge.

Each microbridge 25 services the needs of a single data transfer device 148 (e.g., tape drive, optical disk drive, etc.). The microbridge 25 is tightly coupled to the data transfer device 148 and totally dedicated to servicing the data transfer device 148. Examples of the microbridge 25 include Crossroads 4x50 (TM), ATTO technology FiberBridge 4550 (TM), etc. The microbridge 25 provides protocol conversion such as e.g. Ethernet to SCSI, Fibre Channel to SCSI, 1 Gigabit Ethernet to SCSI, 1 Gigabit Ethernet to ATA, NDMP server implementation, iSCSI server implementation (iSCSI is an emerging IETF standard for encapsulating SCSI over TCP/IP).

Due to the dedicated processing available in each microbridge 25, protocol conversions such as NDMP (Network Data Management Protocol) over TCP/IP to SCSI, iSCSI over TCP/IP to SCSI, and Fibre Channel Protocol to SCSI, etc. are possible. Though in the example embodiments described herein microbridges 25 reside within the drive canisters 145 of the tape library 100, the physical location of each microbridge 25 in relation to a device 148 can be different, and placed in any suitable location inside or outside the library 100.

In one embodiment of the library 100, for a tape drive 148 and a corresponding microbridge 25 there can be three different example interface implementations such as e.g. Fiber Channel, SCSI and proprietary interface. Further, for a microbridge 25 and the host environment 12, there can be three different example interface implementations such as e.g. Ethernet, Fiber channel and Infiniband. This provides nine different interface connections for tape drive 148 to microbridge 25, and microbridge 25 to host 12 interfaces in the library 100. For example, there can be one or more Ethernet type host-to-microbridge interfaces, and one or more SCSI tapedrive-to-microbridge connections in the library 100. Example protocol conversions in each microbridge 25 can include e.g. SCSI over Fibre Channel to parallel SCSI, iSCSI over Ethernet to SCSI, SCSI over Fibre Channel to proprietary interface, SCSI over Fibre Channel to SCSI over Fibre Channel, iSCSI over Ethernet to parallel SCSI, iSCSI over Ethernet to SCSI over Fibre Channel, iSCSI over Ethernet to proprietary interface, NDMP over Ethernet to parallel SCSI, NDMP over Ethernet to SCSI over Fibre Channel, NDMP over Ethernet to proprietary interface, SCSI over InfiniBand to parallel SCSI, SCSI over Infiniband to SCSI over Fibre Channel, SCSI over Infiniband to proprietary interface, and other candidate protocols such as VIA (Virtual Interface Architecture), Infiniband, etc.

According to the present invention, the data transfer bandwidth requirements of the library 100 as a system are decomposed into the individual needs of each tape drive 148 within the library, the bandwidth load is distributed across several small microbridges 25 working independently of each other. Each microbridge 25 services an individual tape drive 148 and therefore, the microbridge 25 is subject to only the bandwidth requirements of a single tape drive 148. In one example, for data rates associated with an individual tape drive 148, general purpose processing of the data stream transferred into or out of a tape drive 148 via a corresponding microbridge 25 can be achieved with a microbridge 25 comprising low priced CPUs and interface chips designed for the PCI bus.

The use of microbridges 25 allows the library 100 to be internally wired using the high speed serial cables of either Ethernet or Fibre Channel regardless of the actual tape drive interface. The tape drive interface 14 can comprise parallel SCSI, Fibre Channel, etc. This greatly simplifies the internal wiring of the library and uses less expensive cables. Example differences between the library 100 using microbridges according to the present invention, and conventional libraries include:

(1) Using microbridges 25 according to the present invention allows the library 100 to be wired as though the tape drives 148 had a native host interface matching the host 12 even though they may not, (2) Because each microbridge 25 only handles the data rates of a corresponding single tape drive 148, the microbridge 25 can use lower cost components than used in conventional bridges, while providing ample excess processing power to accomplish rerouting of host commands to fail-over devices or mirroring of data paths, (3) Failure of an individual microbridge 25 only affects a corresponding, single tape drive 148, (4) The same microbridge design and implementation can be used across a wide family of tape libraries 100, because the performance of the microbridges 25 scales linearly with the number of tape drives 148 present, and (5) A high degree of fault tolerance can be achieved due to the high level of microbridge redundancy (e.g. one microbridge 25 per tape drive 148). Much higher aggregate data throughputs can be achieved by the massively parallel nature of the microbridges 25 and the lack of inter dependencies between the microbridges 25.

As discussed, the microbridges 25 can be packed within the drive canisters 145 of the library 100 to allow for a highly scalable and redundant solution, where each tape drive 148 can be isolated from the others in the library 100. By reducing the bandwidth requirements of a microbridge 25 to those of a single corresponding tape drive 148, the present invention allows performing both transport protocol conversions, such as Fiber Channel to parallel SCSI, as well as offering application level Network Attached Storage (NAS) services such as NDMP data movers, tape servers, and SCSI servers. The present invention further allows simple data routing functions such as splitting an incoming data stream and performing mirrored operations, or transparent rerouting from a first microbridge 25 to a second microbridge 25 if the tape drive 148 associated with the first microbridge 25 fails.

In one example, each microbridge 25 is configured to perform functions including e.g. data routing, application level services, and general data processing, extending the functionality of the microbridges 25 beyond the conventional Fibre Channel (host to bridge) to parallel SCSI (bridge to tape drive) designs. Further, microbridges 25 can be utilized in applications wherein the host interface 15, 29 and drive interface 14, 33 are of the same type of connection (e.g., both the host interface and the device interface may be Fibre Channel, and although a protocol conversion is not necessary in that case, the high availability of functionality provided by mirroring, tape group parity, and drive fail-over makes that a desirable implementation). In particular, in cases wherein the tape drives 148 have transitioned to native Fibre Channel interfaces, the additional functionality provided with microbridge 25 makes a Fibre Channel (host-to-microbridge) to Fibre Channel (microbridge-to-drive) implementation desirable. This is advantageous because of scalability and cost effectiveness of the microbridges 25 to process data on the data path to the tape drives 148, as well as being able to reroute the data. Further, with the addition of an out-of-band networked management interface 31,17, the processing abilities of the microbridges 25 allow for extensive diagnostic capabilities exercising the data interface of the tape drives 148, as well as management functions such as firmware update, embedded SNMP/CIM management agents, and capture of tape drive statistics.

In one example embodiment, the present invention is implemented for use as an embedded NDMP server within Prism libraries by Quantum/ATL (TM). In that implementation Ethernet and parallel SCSI data interfaces are utilized. The host 12 (e.g., a Network Appliance file server) is connected via Ethernet to a microbridge 25, and the microbridge 25 is connected via short parallel SCSI interface to a DLT tape drive 148. This allows ATL (TM) libraries to be connected directly to Ethernet and perform NDMP backups for network attached file servers such as those manufactured by Network Appliance(TM) or Auspex (TM). In another case, Fibre Channel and parallel SCSI data interfaces can be used for bridging applications as well as advanced functionality such as tape mirroring and tape group parity according to the present invention. The host 12 is connected to the microbridges 25 via Fibre Channel, and the microbridges 25 are connected to the corresponding DLT tape drives 148 via parallel SCSI connection. Such a library can include an Ethernet interface for management purposes via external systems (e.g., UniCenter(TM) by Computer Associates (TM), Tivolli(TM) by IBM(TM), OpenView(TM) frameworks by Hewlett Packard(TM), etc.).

The present invention allows use of inexpensive/commodity components for the microbridges 25 such as e.g. Motorola MPC8240 Integrated processor, Intel 82559ER Ethernet chips, LSI 53C875 SCSI interface chips, because each microbridge 25 need only addresses the bandwidth requirements of a single tape drive 148. Further, because in one version each microbridges 25 is embedded in the tape drive canister 145 of corresponding tape driver 148, the same microbridges 25 can be used by any library. And, the present invention scales linearly in performance with respect to the number of tape drives 148 in the library 100. As such, smaller libraries with a small number of tape drives 148 (i.e., minimal configurations) are not burdened with the cost of a conventional bridging systems capable of performing in a fully populated configuration. And, a high level of redundancy is provided, such that a single microbridge 25 failure only affects a minimum number of tape drives 148 (e.g., one tape drive 148). Each microbridge 25 can be implemented using modestly priced CPUs capable or performing generalized processing on the data stream through the microbridge 25, whereby different types of protocol conversions (e.g., implementation of Network Attached Storage protocols), may be performed directly by the microbridge 25. In another aspect, the present invention provides for connecting two or more tape drives 148 to each microbridge 25.

Figure 4B:
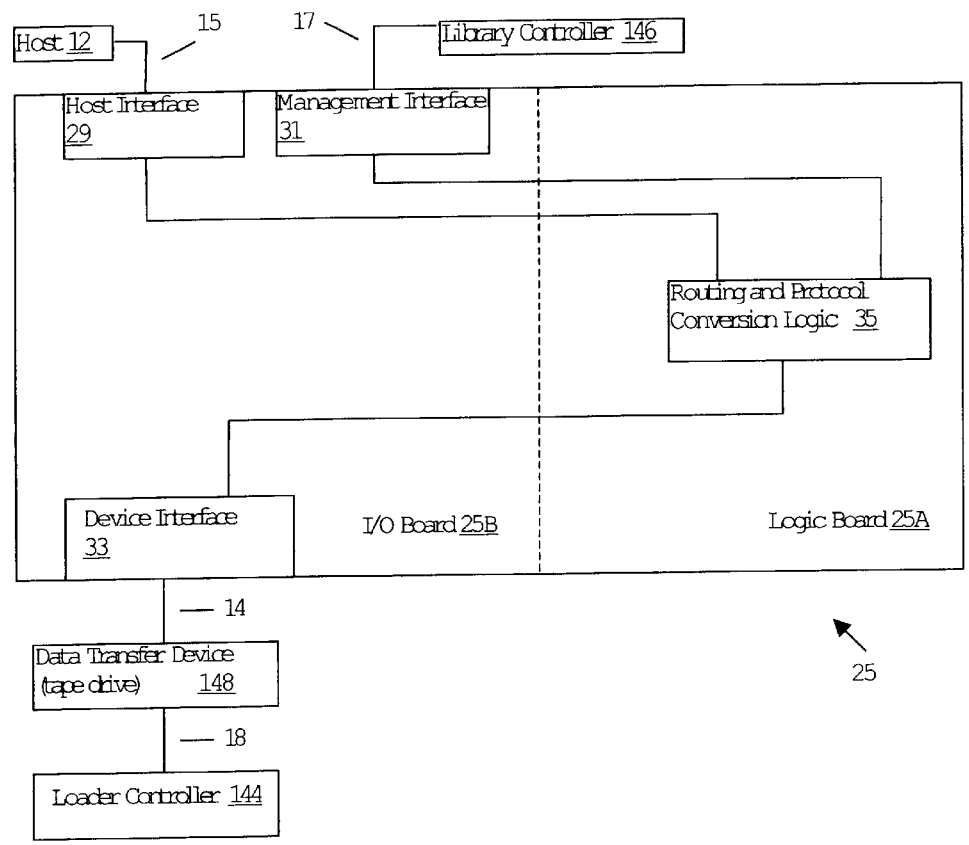
FIG. 4B is an example block diagram of another embodiment of a data transfer device interface such as microbridge of FIG. 3D.

FIG. 4B is an example block diagram of an embodiment of a data transfer device interface such as microbridges 25 of FIGS. 2B and 3D. The following description in relation to embodiments in FIGS. 2A, 3A–C and 4A apply equally to embodiments in FIGS. 2B, 3D and 4B. A communication link 17B is used to perform tasks such as setting the SCSI bus, Fibre Channel ID, or Ethernet address of tape drives 148. In a Fibre Channel embodiment, each microbridge 25 has its own unique port ID. For example, there can be 8 separate port IDs (for 8 microbridges 25), each with only a single LUN for a tape drive 148 corresponding to a microbridge 25, whereby more port addresses are used in the Fibre Channel fabric. Each microbridge 25 has one data transfer LUN, and each microbridge 25 can include a management LUN for the microbridge 25 itself to configure the microbridge 25 (e.g., inband management wherein management commands are sent over the same physical interface as normal data transfers) over the fiber channel. In that case, a management application executing on the host 12 specifies a target LUN internal to the microbridge 25 itself indicating that the command (e.g., management request to alter configuration) is not sent to the corresponding tape drive 148, rather the microbridge 25. The microbridge 25 can be the ultimate endpoint in the fibre channel network, however the host 12 can interact with the tape drive 148 and the microbridge 25. The use of a separate management LUN allows the host 12 to direct a command to either the microbridge 25 or the corresponding tape drive 148, even though both the microbridge 25 and the tape drive 148 are at the same fibre channel port address. Another mode of communication is out-of-band management via e.g. RS 232 or Ethernet, wherein management commands are sent over a physically separate interface than normal data transfers.

Figure 4C:
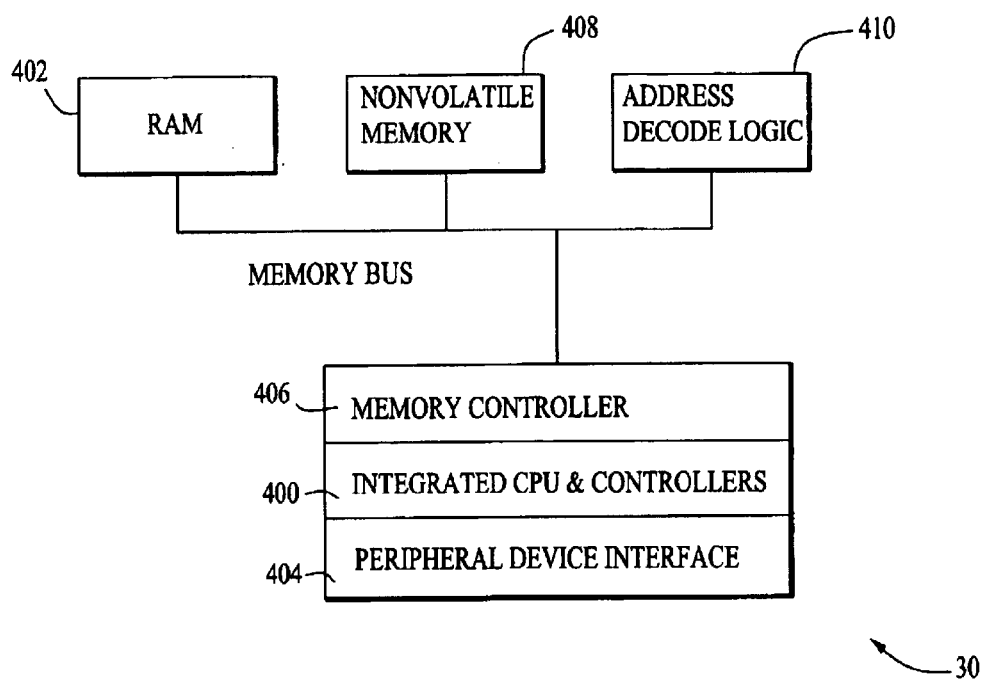
FIG. 4C shows an example block diagram of an embodiment of a logic circuit of a data transfer device interface.

Referring to FIG. 4C, in one embodiment, the logic 35 in each microbridge 25 can comprise a processor (e.g., CPU) 400, memory (e.g., RAM) 402, peripheral device interface (e.g., PCI controller) 404, memory controller 406, FLASH/nonvolatile memory 408 for initialization code, and address decode logic 410 in the form of an FPGA (Field Programmable Gate Array), configured to perform the functions of the microbridges 25 described herein.

Figure 5:
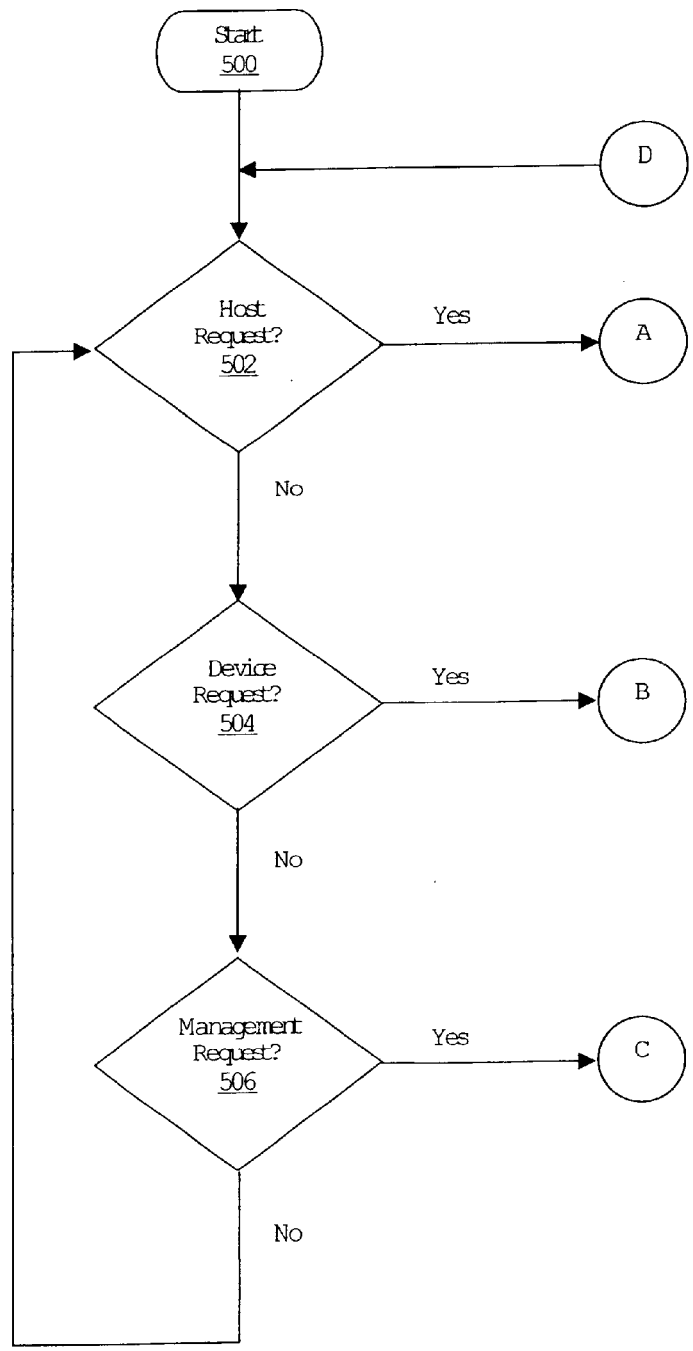
FIG. 5 shows an example flowchart of an embodiment of steps for operation of the data transfer device interface of FIG. 4A, for processing requests.

FIGS. 5–9 show example flowcharts of embodiments of operation steps that can be implemented in the library 100 (e.g., in controllers 146, 144, data transfer device interfaces 25, etc.) for operation according to the present invention. FIG. 5 shows an example flowchart of an embodiment of steps for operation of one or more microbridges 25 in the library 100, wherein said steps can be implemented in e.g. the routing and protocol conversion logic 35 of the microbridges 25. All or a portion of said steps can be implemented in other components of the library 100 such as the controllers 144 and 146.

In one embodiment described herein, each microbridge 25 provides data transfer over the three primary interfaces therein (i.e., the host interface 29, the device interface 33 and the management interface 31 (FIGS. 4A–B)). As used herein, data transfer can include e.g. transfer of information, requests, commands, responses, control signals, etc. Referring to FIG. 5, in a process loop starting with step 500, a microbridge 25 awaits: requests/commands from the host 12 via the host interface 29 (step 502), requests from a corresponding device 148 via the device interface 33 (step 504), and requests/commands from the library controller 146 via the management interface 31 (step 506). If a request is not received, the microbridge 25 repeats steps 502, 504 and 506, until it receives a request via one or more of the three interfaces 29, 33 and/or 31. Upon receiving a request from the host 12 (e.g., requests/commands from the host 12 to the device 148 corresponding to that microbridge 25, such as e.g. write, read, rewind, write file mark, space, inquiry, etc.), the microbridge 25 proceeds to step A in FIG. 6. Upon receiving a request from the corresponding data transfer device 148 (e.g., Reconnect request), the microbridge 25 proceeds to step B in FIG. 7. And, upon receiving a request from the library controller 146 (e.g., set mirror configuration, set fail-over device address, get current configuration, get current status, etc.), the microbridge 25 proceeds to step C in FIG. 9.

Figure 6:
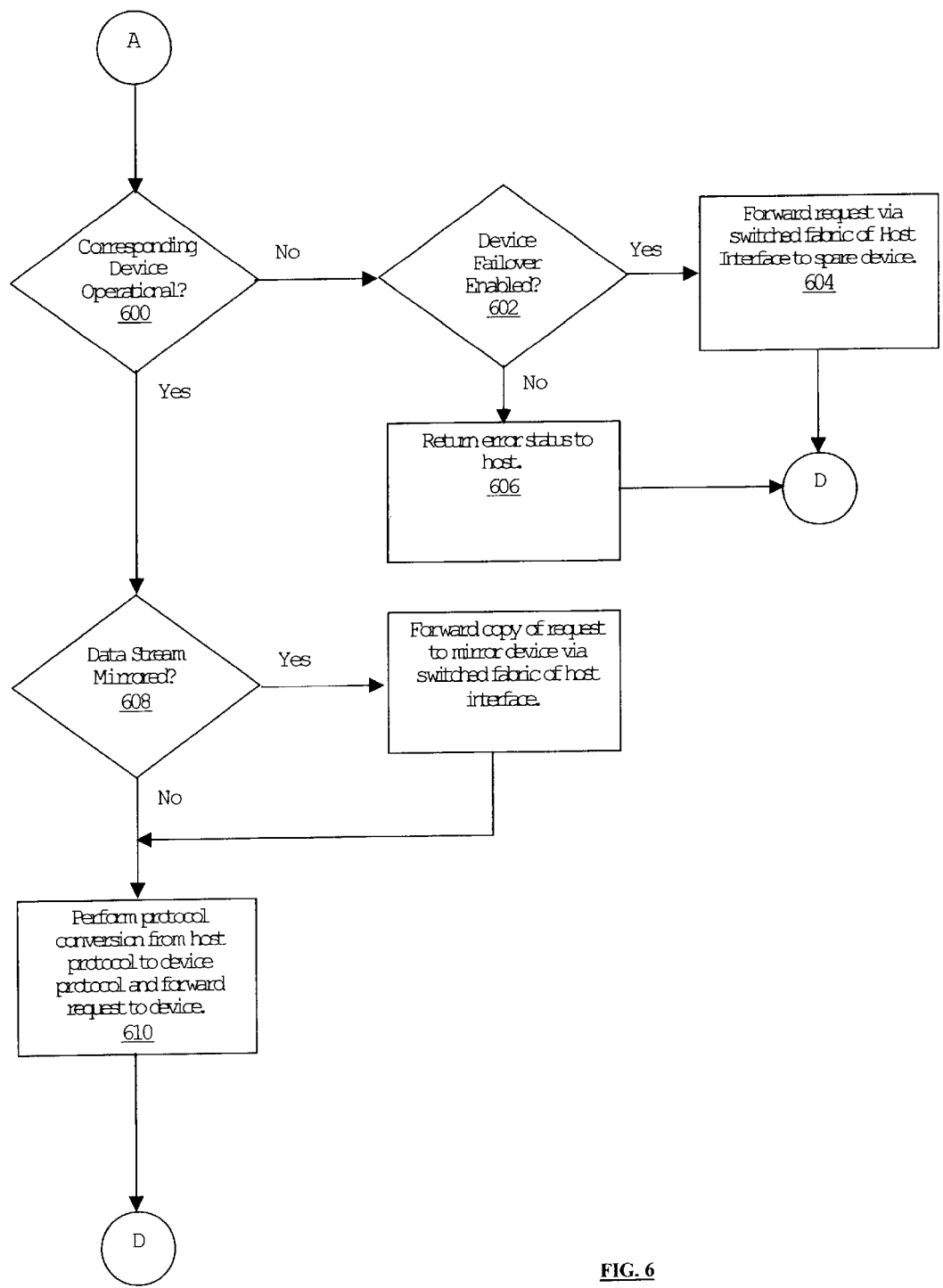
FIG. 6 shows an example flowchart of an embodiment of steps for the data transfer device interface of FIGS. 3A–C for processing requests from the host environment.

Referring to FIG. 6, upon receiving a request from the host 12, the microbridge 25 determines if the corresponding data transfer device 148 is operational (step 600). If the device 148 is not operational, the microbridge 25 determines if a fail-over process is enabled (step 602). An example fail-over processing technique is described in a commonly assigned copending patent application titled "Media Library With Failover Capability", Ser. No. 09/678,900, filed on Oct. 2, 2000, incorporated herein by reference. In one embodiment, because each microbridge 25 handles data load of one device 148 (e.g. tape drive), and has excess processing power remaining, one or more devices 148 are reserved as spare devices wherein a microbridge 25 associated with a device 148 re-routes data to a spare device 148 attached to another microbridge 25 utilizing a switched fabric topology implemented in the microbridges 25 (e.g., Fibre Channel, Ethernet, etc.). In that case, the additional processing power available in microbridges 25 allows e.g. failing-over, mirroring and/or tape group parity from a microbridge 25 attached to a failed device 148 to a another microbridge 25 attached to another device 148, described further below. Whereas in the conventional approaches wherein several devices (tape drives) are attached to the same bridge, due to lack of excess processing capacity in each bridge fail-over, mirroring and tape group parity is limited to devices attached to the same bridge.

If a fail-over process is enabled, the microbridge 25 reroutes requests directed to the failed device 148 to a spare device 148 (e.g., to the corresponding microbridge 25) reserved to take over for the failed device (step 604). As described further below, the library controller 146 performs policy and routing control functions at various times, such as at initialization, and once the microbridges 25 have had their policy set by the library controller 146 (e.g., which spare device 148 to fail-over to, which device to mirror data to, etc.), the microbridges 25 operate autonomously until such time as the library controller 146 commands them to alter their policy.

Using the fail-over feature, media load time errors of tape drives 148 can be masked from the host 12 using a device fail-over process, such as forwarding the request to spare device via switched fabric of the host interface 15, 29, e.g. Fibre Channel. Fibre Channel implements several topologies including loops and fabrics. Loop topology provides connectivity between devices on the same loop with a fixed bandwidth share among all devices on the loop, whereas fabric topology provides virtually unlimited interconnectivity between devices, and each segment of the fabric has dedicated (as opposed to shared) bandwidth available. With the addition of every device to a Fibre Channel loop, the bandwidth available to the other devices active on the same loop decreases, making high levels of interconnectivity and performance provided by the switched fabric topology desirable. Ethernet is also capable of switched fabric topology.

In an example switched fabric topology, each attached device or node is connected to a port that is part of a fabric, and receives a full bandwidth data path to any other connection on the fabric. A port is the access point of the fabric for physically connecting to another Node. The fabric may be a switch or series of switches and is responsible for routing between devices, error detection and correction, and flow control. The operation of the fabric is independent of the higher layer communication protocols, largely distance-insensitive, and may be based on any technology. Communication paths, provide a bi-directional connection between the devices and each fabric port. The switched fabric topology provides the maximum connection capability and total aggregate throughput of all the fibre channel topologies. The switched fabric topology provides the capability to interconnect large number of systems; to sustain high bandwidth requirements; to match data rates between connections of different speeds; and to match different cabling elements.

As described, one or more tape drives 148 can be reserved as spare tape drives (spare data transfer devices) and are masked from the host computing environment 12 such that the spare tape drives are not directly accessible by the host 12. In one embodiment of the library 100, when the host 12 dispatches a medium-changer command, such as EXCHANGE MEDIUM command (including a source storage media slot location and a final logical drive address of a specified drive), the library controller 146 locates the source address and the final destination address and determines if a tape drive specified by the destination address is available. If the specified tape drive is not available (e.g., failed), the library controller 146 performs a "failover process" for this load-time error by using a spare tape drive in place of the specified tape drive (e.g., by redirecting the host command from the specified tape drive to the spare tape drive, and controlling the loader 114 for moving a requested tape cartridge at the storage slot location 112 to the spare tape drive instead of the specified tape drive). The above is a "load time" failure example, and as such redirecting the host command from the specified tape drive to the spare tape drive by the library controller 146 includes commanding the spare tape drive to "take over" the fabric address of the failed specified tape drive. This is as opposed to a mirroring technique, described below, wherein the microbridge is actively "forwarding" the data stream to another, mirror, tape drive.

The storage unit controller 39 (e.g., library controller 146) can further be configured for determining availability of a host specified data transfer device 148 on the basis of detecting occurrence of at least one predetermined condition such as e.g. operational status, wear and tear, etc. Similarly, each microbridge 25 can be configured for determining availability of a host specified data transfer device 148 corresponding to that microbridge 25, on the basis of detecting occurrence of at least one predetermined condition. The microbridge 25 detects the error condition, and it is reported to the controller 146. In the case of "load time" failures, the controller 146 performs the error recovery, if any, because robotic movement is required. In the case of mirroring and tape group parity, the microbridge 25 detects and reports the problem, however the microbridge 25 is responsible for any error recovery.

For load time tape drive fail-over processing, the controller 146 queries the microbridge 25 for a specified tape drive status (the microbridge gathers more information about the tape drive's health than is available e.g. over the RS422 port 18, such that when the microbridge 25 is present it is preferable to use said information gathered by the microbridge). When the controller 146 detects the load time tape drive error from the microbridge 25, the controller 146 commands the microbridge 25 associated with the failed tape drive to deactivate its host interface, and commands the microbridge 25 of the spare drive 148 to take over the address of the failed tape drive (e.g., the library controller remaps address of the failed tape drive 148). Finally, the controller 146 loads the requested cartridge into the spare tape drive. As such, the microbridge 25 of the failed tape drive sends host commands/data to the microbridge 25 of the spare tape drive for load time errors.

Typically, device fail-over processing cannot recover from or mask device errors occurring in the middle of a data stream. Device errors occurring in the middle of a data stream can be masked from the host 12 using mirroring and parity techniques. A fabric network allows full interconnectivity among the microbridges with full bandwidth, whereby one microbridge 25 can reroute host commands to another microbridge 25 through the fabric e.g. for mirroring and tape group parity. An important aspect of mirroring and tape group parity is that even though one of the devices 148 may have failed, the data continues to be forwarded to the mirror device or parity device, so that the data transfer operation does not fail.

In another embodiment, the library controller 146 manages and coordinates all policy decisions such as e.g., number of available spare devices 148, the devices 148 to be mirrored, pairings for mirrored devices, devices 148 in failure mode and re-mappings/re-routings in effect, etc. In addition, there can be dual/redundant library controllers 146 to avoid a single point of failure in the library system. Policy and routing control functions can be initialization functions by the library controller 146, and once the microbridges 25 have had their policy set by management communication from the library controller 146, the microbridges 25 operate autonomously until such time as the library controller 146 commands them to alter their policy. The host 12 can communicate with each particular device 148 through a corresponding microbridge 25. In the mirrored and tape group parity cases, the control logic 35 in a microbridge 25 can continue to split the data stream and forward the data stream onto the redundant devices (e.g. the mirror device or the parity device) such that the failure does not affect the host 12 data transfer. The library controller 146 receives and decodes host commands for the robotic control portion (e.g., robotic controller 144) of the library 100. As such, in one version, the library controller 146 does not receive nor decode host commands destined for the individual tape drives 148 within the library. Whereby, although the library controller 146 may alter the host data path to the tape drives 148 by reconfiguring the microbridges 25, the library controller 146 is not on the host to tape drive 148 data path, and therefore has no visibility as to how the host 12 commands the individual tape drives 148 to operate. The library controller 146 decodes the host commands to the robotic element (e.g., the robotic controller 144 and the picker).

The microbridges 25 are on the data path between the host 12 and the drives 148, and each microbridge 25 receives and decodes the host commands destined to the corresponding tape drive 148. In one version, the microbridges 25 do not necessarily receive the robotic control commands from the host 12, while in another version at least one of the microbridges 25 functions further as the host interface to the robotic controller 146. The latter embodiment provides a highly redundant/fault tolerant library system.

Continuing with FIG. 6, if in step 602 the microbridge 25 determines that fail-over processing is not enabled, an error status is returned to the host 12 (step 606). If in step 600 above, the microbridge 25 determines that the corresponding device 148 is operational, and the data stream through the microbridge 25 is not to be mirrored (step 608), the microbridge 25 performs protocol conversion from the host 12 protocol to the device 148 protocol and forwards the host request to the device 148 (step 610). If in step 608, the data stream is to be mirrored, the microbridge 25 forwards a copy of the host request to a mirror device (e.g., another tape drive which maybe in the same library or in a separate library) via the switched fabric of the host interface 15, 29 (e.g., Fibre Channel) for processing by the mirror device, before proceeding to step 610. After steps 604, 606 or 610, the microbridge 25 proceeds to step D in FIG. 5 to start of said loop process in the microbridge 25 again.

Figure 7:
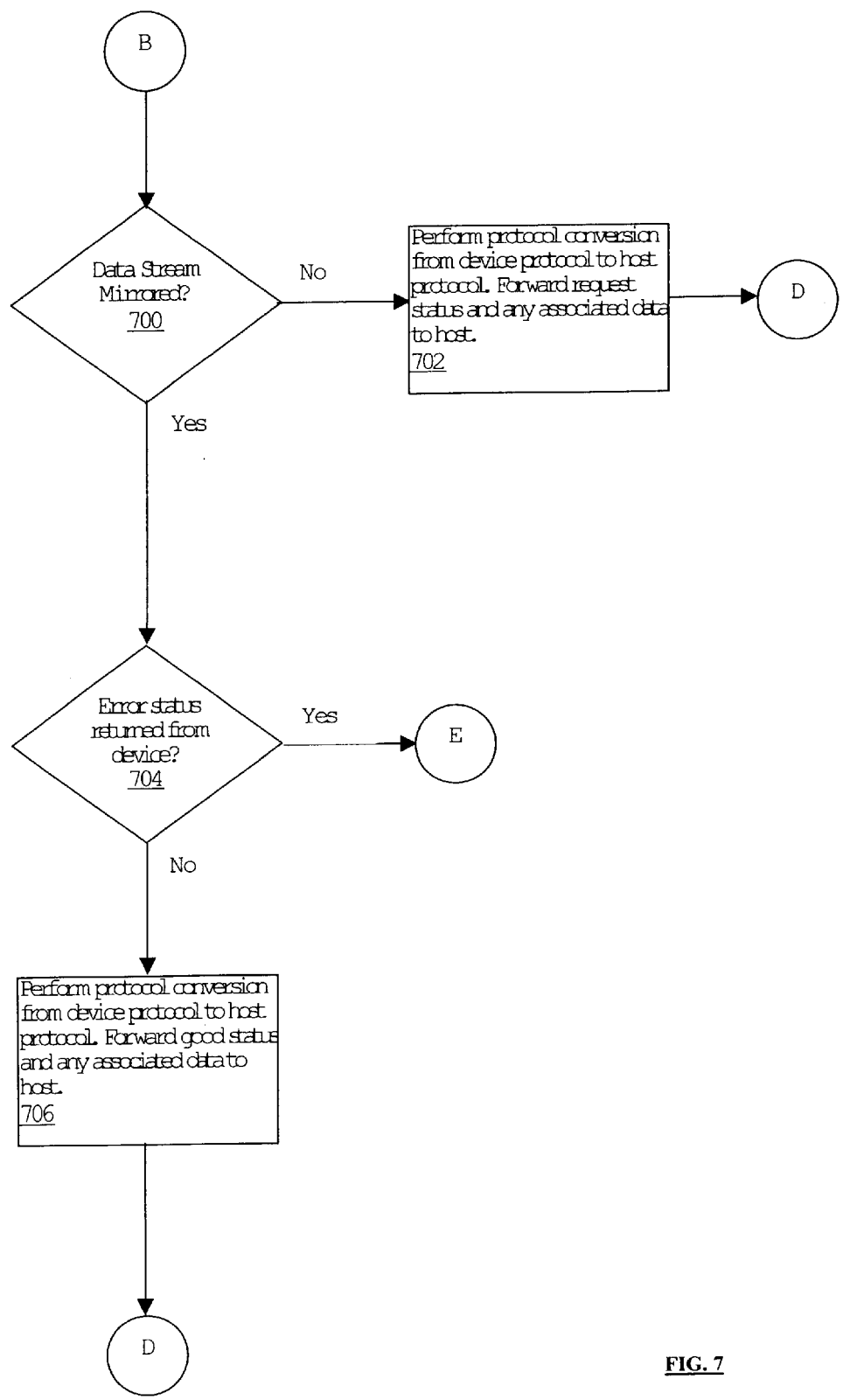
FIG. 7 shows an example flowchart of an embodiment of steps for the data transfer device interface of FIGS. 3A–C for processing requests from the corresponding data transfer device.

Referring to FIG. 7, upon receiving a request from the corresponding device 148, if the data stream through the microbridge 25 is not mirrored (step 700), the microbridge 25 performs protocol conversion from the device 148 protocol to the host 12 protocol, and forwards request status and any associated data to the host 12 (step 702). Device 148 requests are not unsolicited, and are in response to a previous host request that has been forwarded to the device 148. In non-error and non-mirrored cases, the process includes converting the protocol back to the format the host 12 expects and forwarding the returned status and any associated data to the host 12.

If in step 700, data stream is mirrored, the microbridge 25 determines if the device 148 has returned an error status (step 704). If no such error, the microbridge 25 performs protocol conversion from the device 148 protocol to the host 12 protocol, and forwards 'good' status and associated data to the host 12. After steps 702 and 706, the microbridge 25 proceeds to step D in FIG. 5 to start of said loop process in the microbridge 25 again.

Figure 8:
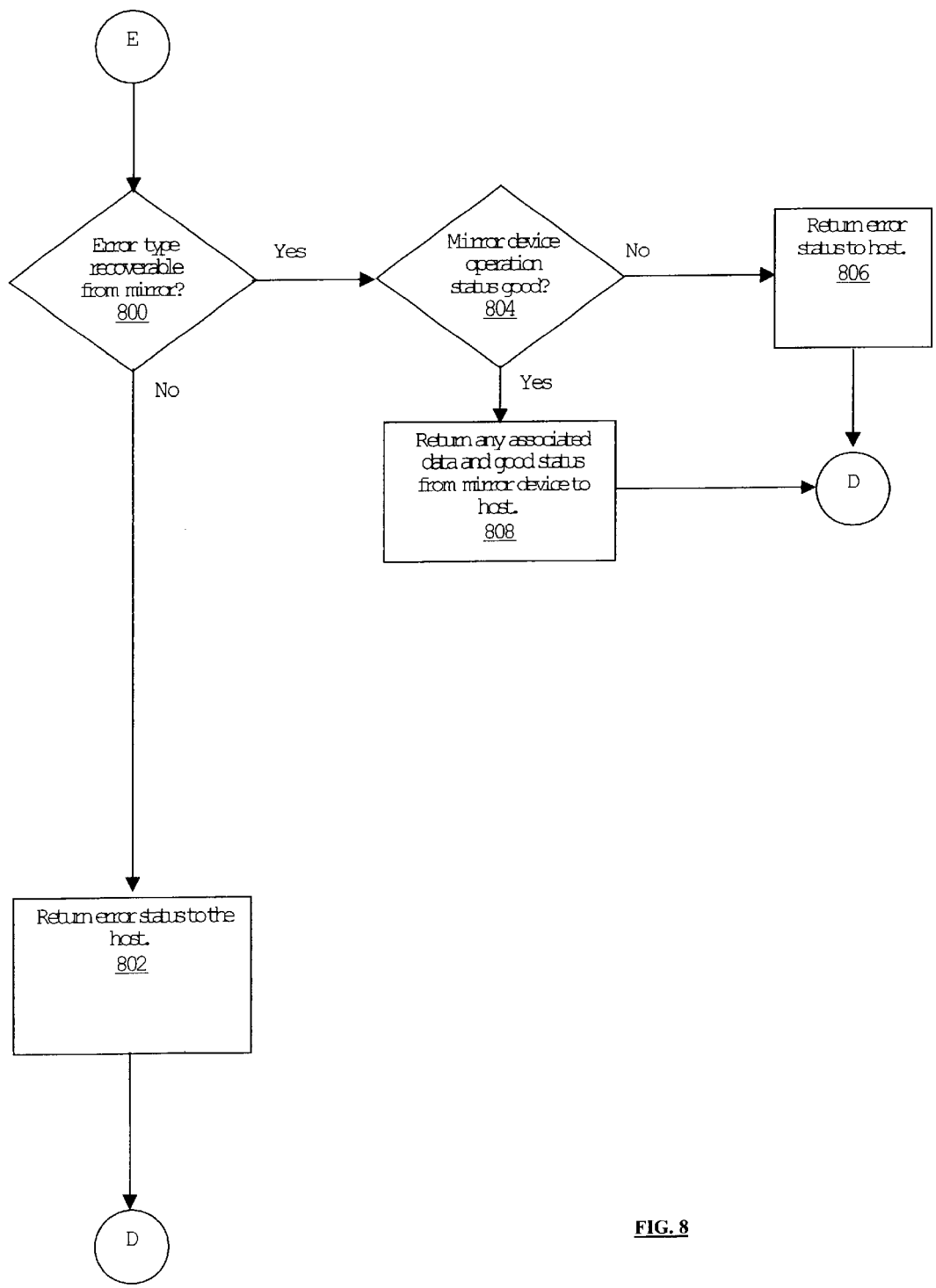
FIG. 8 shows an example flowchart of an embodiment of steps for the data transfer device interface of FIGS. 3A–C to perform error recovery for mirroring.

If in step 704, there is error status from the device 148, the microbridge 25 proceeds to step E in FIG. 8 for error recovery for mirroring. Although not all types of error conditions are recoverable from mirrored devices, under many circumstances, an error occurring on one device or piece of media can be hidden from the host 12 as long as the other half of the mirror is functional. In one embodiment, mirroring is a data duplication technique wherein a single incoming host request for I/O to a particular device 148 is transformed into two I/O requests for two physically separate devices 148 (mirrored pair). Although this requires twice the number of devices 148, it allows the storage subsystem to recover from errors as long as one of the devices 148 in the mirrored pair remains operational. The second device 148 of the mirrored pair is not directly visible to the host 12, and the host 12 cannot determine if it is connected to a single device 148 or a mirrored device 148. For all of the example host interfaces implemented by the microbridge 25 (e.g., Fibre Channel, Ethernet, Infiniband, etc.), the same interface can be used to both receive commands and forward them onto another device. Because all of the devices 148 on a single segment (e.g., same physical wire or cable) of any of said technologies (e.g., SCSI, Fibre Channel, Ethernet, Infiniband, etc.) share bandwidth, the devices 148 are connected to a switch which both isolates segments to increase available bandwidth and increase interconnectivity. A switch can comprise a device having multiple external interfaces, and capable of facilitating internal interconnections between any pair of external interfaces without performance impact to any of the other external devices. For example, Ethernet switches from Cisco(TM), and Fibre Channel switched from Brocade(TM) are suitable.

For a mirroring example, the mirrored pair must have a communication link connection therebetween. In one example, such connectivity is accomplished by placing both devices of the mirrored pair on the same segment/loop. Preferably, both devices of the mirrored pair are connected via a switch, providing dedicated bandwidth and full interconnectivity. In one version, to perform mirroring operations, a microbridge 25 sends a separate copy of a host request received via the host interface 29 to both devices 148 of the mirrored pair. The path to the second device 148 of the mirrored pair is back out the host interface 15, 29 and through switches (external to the library 100 and not shown) to the host interface 15, 29 of the microbridge 25 of the second device 148.

Referring to FIG. 8, to perform error recovery for mirroring, the microbridge 25 determines if the data stream error is recoverable from the mirror device 148 (step 800). If not, the microbridge 25 returns error status to the host 12 (step 802) and proceeds to step D in FIG. 5. If the error can be recovered, the microbridge 25 determines if the mirror device 148 operation is in 'good' status (step 804), and if not, the microbridge 25 returns error status to the host 12 (step 806), and proceeds to step D. However, if in step 804, the mirror device 148 operational status is 'good', the microbridge 25 returns any associated data and 'good' status from the mirror device to the host 12 to recover from the error (step 808), and proceeds to step D.

Figure 9:
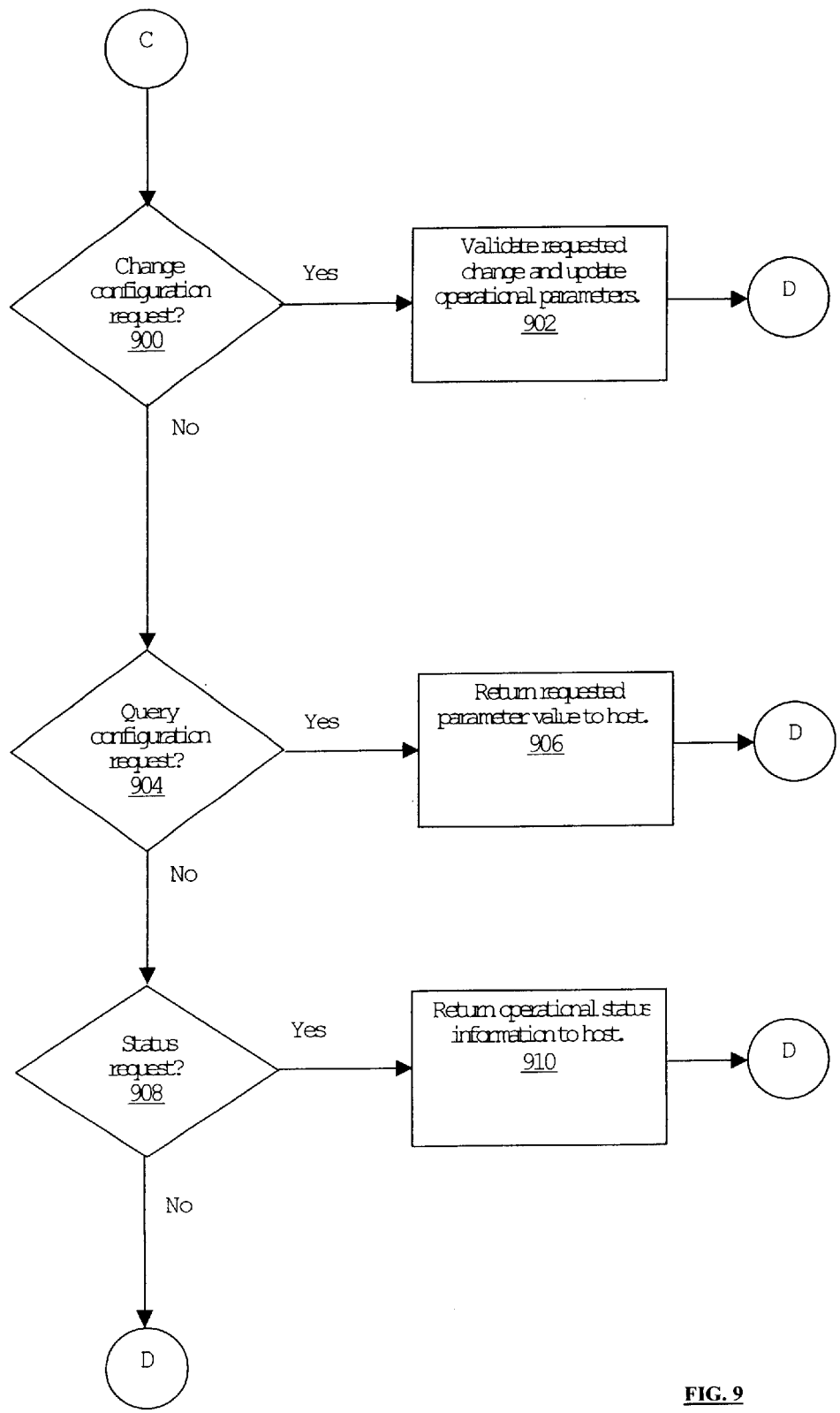
FIG. 9 shows an example flowchart of an embodiment of steps for the data transfer device interface of FIGS. 3A–C for processing requests from the library controller.

The microbridges 25 have many operational parameters which may be altered or inspected by e.g. the library controller 146. These include e.g. the device 148 ID settings, functional options such as device fail-over enable/disable, mirroring enable/disable, designation of the address for the mirrored device, designation of the address for the fail-over device, current temperature monitoring, etc. Referring to FIG. 9, upon receiving a request from the library controller 146 (e.g., at initialization or other occasions) via the management interface 31, the microbridge 25 determines if the request is for changing configuration (e.g., parameters such as e.g., device ID, device fail-over enable/disable, mirroring enable/disable, mirroring parameters (e.g., address of the mirror device), fail-over parameters such as e.g. address of the spare device) (step 900). If so, the microbridge 25 validates the requested change and updates operational parameters of the microbridge 25 (step 902). If the request is not for configuration change, the microbridge 25 determines if the request includes a configuration query (step 904). If so, the microbridge 25 returns the requested parameter value to the host 12 via the library management controller 146 (step 906). If the request is not a configuration query, then the microbridge 25 determines if the request if for status (step 906), in which case the microbridge returns operations status information to the host 12 via the library management controller 146 (step 910). After performing steps 902, 906 or 910, the microbridge 25 proceeds to step D in FIG. 5.

In one embodiment, Tape Group Parity, referenced above, comprises another data duplication technique analogous to Redundant Array of Inexpensive Drives (RAID) level 4 protection for tapes. In Tape Group Parity, as in RAID level 4, a parity calculation is computed across a group of tapes and subsequently written out to a separate tape reserved for that purpose. In the event that an original tape is lost, destroyed, or becomes unreadable, its contents can later be reconstructed by performing a mathematical function to the parity tape and the remaining good tapes. A feature of the Tape Group Parity, compared to normal RAID algorithms applied to tapes, is that Tape Group Parity allows the parity tape to be virtualized to disk and constructed over time without requiring all members of the Tape Group to be mounted simultaneously. To do so, the library controller splits the incoming data stream as it does for mirroring (described above), along with additional processing for building and maintaining the parity set.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A digital data storage unit, comprising:

a multiplicity of storage media slots, each storage media slot for receiving a storage media unit, a plurality of storage media units loaded in particular ones of the storage media slots, a plurality of data transfer devices for writing data to and reading data from the storage media units, a plurality of data transfer device interfaces corresponding to the plurality of the data transfer devices, each data transfer device interface configured for selectively transferring data between a data transfer device and a host computing environment, wherein at least a number of the data transfer device interfaces are interconnected via at least a communication link, such that each of said at least a number of data transfer device interfaces includes logic circuitry for selectively routing data to one or more other data transfer devices, a loader mechanism for selectively moving a storage media unit between a storage media slot and one of the plurality of data transfer devices, and a storage unit controller connected to the loader mechanism and to the data transfer device interfaces, wherein the storage unit controller is configured for connection to the host computing environment to receive and decode one or more host commands sent by the host computing environment at the storage unit controller, and for controlling the loader mechanism for selectively moving storage media units from the storage media slot locations to the data transfer devices for data transfer in response to host commands.

2. The digital data storage unit of claim 1, wherein each data transfer device has a unique logical address, and at least one host command comprises a media unit access request including a media unit address generated by the host computing environment and a logical address corresponding to a data storage drive specified by the host computing environment, and wherein the storage unit controller controls the loader mechanism for moving said requested storage media unit from the storage media slot location to the specified data transfer device, wherein the requested media unit address comprises a source address corresponding to a storage media slot location containing the requested media unit.

3. The digital data storage unit of claim 1, further comprising a plurality of device canisters, wherein each data transfer device and a corresponding data transfer device interface are housed in a device canister.

4. The digital data storage unit of claim 1, wherein each data transfer device comprises a media player for writing data to and reading data from a storage media unit.

5. The digital data storage unit of claim 1, wherein at least a number of data transfer device interfaces are further configured for transferring data between any selected data transfer device and a host computing environment, wherein the selected data transfer device is selected from the plurality of the data transfer devices and wherein data transfer between the selected data transfer device and the host computing environment is routed through the data transfer device interface.

6. The digital data storage unit of claim 1, wherein at least one data transfer device interface selectively transfers data between the host computing environment and selected ones of a plurality of data transfer devices.

7. The digital data storage unit of claim 1, wherein at least one data transfer device interface comprises a switched fabric topology.

8. The digital data storage unit of claim 1, wherein at least one data transfer device interface comprises a microcontroller programmed to perform said data transfer functions between a corresponding data transfer device and the host computing environment.

9. The digital data storage unit of claim 1 wherein each data transfer device interface includes:

a host interface for connecting that data transfer device interface to the host computing environment, a management interface for connecting that data transfer device interface to the storage unit controller for management communication, and a device data interface for connecting that data transfer device interface to a corresponding data transfer device via a device communication link.

10. The digital data storage unit of claim 9, wherein the device data interface in at least one data transfer device interface comprises a fibre channel interface connected to a corresponding data transfer device via said device communication link.

11. The digital data storage unit of claim 9, wherein the device data interface in at least one data transfer device interface comprises a SCSI interface connected to a corresponding data transfer device via said device communication link.

12. The digital data storage unit of claim 9, wherein the device data interface in at least one data transfer device interface comprises an Ethernet interface connected to a corresponding data transfer device via said device communication link.

13. The digital data storage unit of claim 9, wherein the device data interface in at least one data transfer device interface comprises an Infiniband interface connected to a corresponding data transfer via said device communication link.

14. The digital data storage unit of claim 1, further comprising at least one host computer interface module for connecting the digital data storage unit to the host computing environment via at least one communication link, wherein the host computing environment communicates with the storage unit controller via the host computer interface module.

15. The digital data storage unit of claim 9, wherein the host interface in at least one data transfer device interface comprises a fibre channel interface for connecting that data transfer device interface to the host computing environment.

16. The digital data storage unit of claim 9, wherein the host interface in at least one data transfer device interface comprises an Ethernet interface for connecting that data transfer device interface to the host computing environment.

17. The digital data storage unit of claim 9, wherein the host interface in at least one data transfer device interface comprises an Infiniband interface for connecting that data transfer device interface to the host computing environment.

18. The digital data storage unit of claim 9, wherein the management interface in at least one data transfer device interface comprises a fibre channel interface connected to the storage unit controller via a communication link.

19. The digital data storage unit of claim 9, wherein the management interface in at least one data transfer device interface comprises a i2c channel interface connected to the storage unit controller via a communication link.

20. The digital data storage unit of claim 9, wherein the management interface in at least one data transfer device interface comprises a USB interface connected to the storage unit controller via a communication link.

21. The digital data storage unit of claim 9, wherein the management interface in at least one data transfer device interface comprises an Ethernet interface connected to the storage unit controller via a communication link.

22. The digital data storage unit of claim 9, wherein the storage unit controller is further configured for selectively managing configuration of the data transfer device interfaces via the management interface in each data transfer device interface.

23. The digital data storage unit of claim 22, wherein said management configuration of the data transfer device interfaces by the storage unit controller includes selectively configuring data routing by each data transfer device interface to one or more other data transfer device interfaces.

24. The digital data storage unit of claim 22, wherein said management configuration of the data transfer device interfaces by the storage unit controller includes selectively configuring protocol conversion by each data transfer device interface.

25. The digital data storage unit of claim 1, wherein one or more data transfer device interfaces are configured to receive and decode host commands sent by the host computing environment to specified data transfer devices corresponding to said one or more data transfer device interfaces.

26. The digital data storage unit of claim 25, wherein the storage unit controller is further configured for selectively controlling at least one data transfer device interface for rerouting data flow between the host computing environment and a specified data transfer device to a second data transfer device.

27. The digital data storage unit of claim 25, wherein the storage unit controller is further configured for using a second data transfer device in place of a specified data transfer device by rerouting host commands directed to the specified data transfer device to said second data transfer device, and controlling the loader mechanism for moving the requested media storage unit at the storage media slot location to the second data transfer device.

28. The digital data storage unit of claim 27, wherein at least one data transfer device is reserved as a spare data transfer device and wherein the storage unit controller is configured to selectively control at least one data transfer device interface for rerouting data flow between the host computing environment and a corresponding data transfer device specified by the host computing environment, to the spare data transfer device.

29. The digital data storage unit of claim 28, wherein the storage unit controller is further configured for determining if a data transfer device specified by the host computing environment for data transfer is available, and if not, then using a spare data transfer device in place of the specified data transfer device, and signaling the loader mechanism for moving the requested media storage unit at the storage media slot location to the spare data transfer device.

30. The digital data storage unit of claim 25, wherein at least a number of data transfer device interfaces including logic circuitry for selectively routing data to one or more of said data transfer device interfaces.

31. The digital data storage unit of claim 30, wherein each of said at least a number of data transfer device interfaces is further configured for selectively routing host commands directed to a specified data transfer device, to a data transfer device interface corresponding to another data transfer device.

32. The digital data storage unit of claim 1, wherein:
at least one host command includes a source address corresponding to a storage media slot location and a destination address corresponding to a data transfer device specified by the host computing environment; and
the storage unit controller is further configured for:
determining if the specified data transfer device is available, and
if the specified data transfer device is not available, then using a spare data transfer device in place of the specified data transfer device.

33. The digital data storage unit of claim 32, wherein the storage unit controller is further configured for determining if the specified data transfer device is available by: querying status information from the data transfer device interface corresponding to the specified data transfer device.

34. The digital data storage unit of claim 32, wherein the storage unit controller is further configured for using a spare data transfer device in place of the specified data transfer device by: redirecting the host command from the data transfer device interface corresponding to the specified data transfer device, to the data transfer device interface corresponding to the spare data transfer device.

35. The digital data storage unit of claim 34, wherein the storage unit controller is further configured for redirecting the host command from the data transfer device interface corresponding to the specified data transfer device, to the data transfer device interface corresponding to the spare data transfer device, by: changing the address of the spare data transfer device to correspond to the destination address of the specified data transfer device.

36. The digital data storage unit of claim 34, wherein the storage unit controller is further configured for redirecting the host command from the data transfer device interface corresponding to the specified data transfer device, to the data transfer device interface corresponding to the spare data transfer device, by: commanding the data transfer device interface corresponding to the spare data transfer device to change the address of the spare data transfer device to correspond to the destination address of the specified data transfer device.

37. The digital data storage unit of claim 25, wherein the storage unit controller comprises a microcontroller programmed to perform said storage unit controller functions including receiving and decoding host commands sent by the host computing environment at the storage controller to control the loader mechanism, and generating control signals for the loader mechanism to move the requested media storage unit at the storage media slot location to a data transfer device.

38. The digital data storage unit of claim 25, wherein the storage unit controller comprises:
  a loader controller for controlling the loader mechanism to selectively move a storage media unit between a storage media slot and one of the plurality of data transfer devices; and
  a storage controller configured for:
    receiving and decoding at least one host command sent by the host computing environment at the storage controller to control the loader mechanism, the host command including a source address corresponding to a storage media slot location, and a logical destination drive address corresponding to a data transfer device specified by the host computing environment, and
    signaling the loader controller for moving a requested media storage unit at the storage media slot location to a data transfer device.

39. The digital data storage unit of claim 1, wherein each storage media unit comprises a tape cartridge, and wherein the data transfer devices comprise tape drives for writing and reading digital data to and from tape media within one or more tape cartridges.

40. The digital data storage unit of claim 1, wherein the storage unit controller is further configured for data duplication including transferring data from the host computing environment to both a host specified data transfer device and to at least another data transfer device.

41. The digital data storage unit of claim 1, wherein at least one data transfer device interface is further configured for data duplication including transferring data from the host computing environment to both the corresponding specified data transfer device and to at least another data transfer device.

42. The digital data storage unit of claim 41, wherein at least a number of the data transfer device interfaces are interconnected via at least a communication link, each of said at least a number of data transfer device interfaces including logic circuitry for selectively routing data to one or more other data transfer devices interfaces.

43. The digital data storage unit of claim 1, wherein at least one data transfer device interface is further configured for data duplication including transferring data from the host computing environment to both the corresponding specified data transfer device and to at least another data transfer device interface corresponding to another data transfer device.

44. The digital data storage unit of claim 40, wherein said data duplication comprises data mirroring, such that the specified data transfer device and said other data transfer device form a mirrored pair.

45. The digital data storage unit of claim 40, wherein said data duplication comprises tape parity grouping, such that two or more data transfer devices form a parity group.

46. The digital data storage unit of claim 40, wherein if the host specified data transfer device is not operational, the storage unit controller continues transferring data from the host computing environment to said at least another data transfer device.

47. A method for controlling a digital data storage unit comprising a multiplicity of storage media slots for receiving media storage units, a plurality of media storage units loaded in particular ones of the storage media slots, a plurality of data transfer devices for writing data to and reading data from the storage media units, a loader mechanism for selectively moving a media storage unit between a storage media slot and one of the plurality of data transfer devices, and a storage unit controller connected to a host computing environment, the method comprising the steps of:
  providing a plurality of data transfer device interfaces corresponding to the plurality of the data transfer devices, each data transfer device interface configured for selectively transferring data between a data transfer device and the host computing environment, wherein at least one data transfer device interface includes a communication protocol converter that translates from one protocol to another;
  receiving and decoding a host command sent by the host computing environment at the storage unit controller, the host command including a source address corresponding to a storage media slot location and a destination address corresponding to a data storage drive specified by the host computing environment; and
  controlling the loader mechanism for selectively moving storage media units from the storage media slot locations to the data transfer devices for data transfer in response to host commands.

48. The method of claim 47, wherein at least a number of the data transfer device interfaces are interconnected via at least a communication link, the method further comprising the steps of selectively routing data from one data transfer device interface to at least another data transfer device interface.

49. The method of claim 47, further comprising the steps of performing communication protocol conversion in at least one data transfer device interface for data transfer between the corresponding data transfer device and the host computing environment.

50. The method of claim 47 wherein each data transfer device interface includes a device data interface for connecting that data transfer device interface to a corresponding data transfer device via a device communication link.

51. The method of claim 47, wherein each data transfer device interface includes a host interface for connecting that data transfer device interface to the host computing environment.

52. The method of claim 47, wherein each data transfer device interface includes a management interface for connecting that data transfer device interface to the storage unit controller for management communication.

53. The method of claim 52, further comprising the steps of selectively managing configuration of the data transfer device interfaces via the management interface in each data transfer device interface.

54. The method of claim 53, wherein the step of managing configuration of the data transfer device interfaces includes selectively configuring data routing by each data transfer device interface to one or more other data transfer device interfaces.

55. The method of claim 53, wherein the step of managing configuration of the data transfer device interfaces includes selectively configuring protocol conversion by each data transfer device interface.

56. The method of claim 47, further comprising the steps of receiving and decoding host commands sent by the host computing environment to specified data transfer devices at corresponding data transfer device interfaces.

57. The method of claim 47, further comprising the steps of selectively controlling at least one data transfer device interface for rerouting data flow between the host computing environment and a specified data transfer device to a second data transfer device.

58. The method of claim 47, further comprising the steps of:
using a second data transfer device in place of a specified data transfer device by rerouting host commands directed to the specified data transfer device to said second data transfer device, and
controlling the loader mechanism for moving the requested media storage unit at the storage media slot location to the second data transfer device.

59. The method of claim 47, further comprising the steps of:
reserving at least one data transfer device as a spare data transfer device, and
selectively controlling at least one data transfer device interface for rerouting data flow between the host computing environment and a corresponding data transfer device specified by the host computing environment, to the spare data transfer device.

60. The method of claim 59, further comprising the steps of:
determining if a data transfer device specified by the host computing environment for data transfer is available, and
if not, then using a spare data transfer device in place of the specified data transfer device, and signaling the loader mechanism for moving the requested media storage unit at the storage media slot location to the spare data transfer device.

61. The method of claim 47, wherein at least a number of the data transfer device interfaces are interconnected via at least a communication link, further comprising the steps of selectively routing data from one data transfer device interface to one or more other data transfer device interfaces.

62. The method of claim 61, further comprising the steps of selectively routing host commands directed to a specified data transfer device, to a data transfer device interface corresponding to another data transfer device.

63. The method of claim 47, wherein:
at least one host command includes a source address corresponding to a storage media slot location and a destination address corresponding to a data transfer device specified by the host computing environment;
further comprising the steps of:
determining if the specified data transfer device is available, and
if the specified data transfer device is not available, then using a spare data transfer device in place of the specified data transfer device.

64. The method of claim 63, further comprising the steps of determining if the specified data transfer device is available by querying status information from the data transfer device interface corresponding to the specified data transfer device.

65. The method of claim 63 further comprising the steps of using a spare data transfer device in place of the specified data transfer device by redirecting the host command from the data transfer device interface corresponding to the specified data transfer device, to the data transfer device interface corresponding to the spare data transfer device.

66. The method of claim 65 further comprising the steps of redirecting the host command from the data transfer device interface corresponding to the specified data transfer device, to the data transfer device interface corresponding to the spare data transfer device, by steps including changing the address of the spare data transfer device to correspond to the destination address of the specified data transfer device.

67. The method of claim 65 further comprising the steps of redirecting the host command from the data transfer device interface corresponding to the specified data transfer device, to the data transfer device interface corresponding to the spare data transfer device, by steps including: commanding the data transfer device interface corresponding to the spare data transfer device to change the address of the spare data transfer device to correspond to the destination address of the specified data transfer device.

68. The method of claim 47, further comprising the steps of data duplication including transferring data from the host computing environment to both a host specified data transfer device and to at least another data transfer device.

69. The method of claim 68, wherein said data duplication step further comprises data mirroring, such that the specified data transfer device and said other data transfer device form a mirrored pair.

70. The method of claim 68, wherein said data duplication step further comprises parity grouping, such that two or more data transfer devices form a parity group.

71. A digital data storage unit, comprising:
a multiplicity of storage media slots, each storage media slot for receiving a storage media unit,
a plurality of storage media units loaded in particular ones of the storage media slots,
a plurality of data transfer devices for writing data to and reading data from the storage media units,
a plurality of data transfer device interfaces corresponding to the plurality of the data transfer devices, each data transfer device interface configured for selectively transferring data between a data transfer device and a host computing environment, wherein at least one data transfer device interface includes a communication protocol converter that translates from one protocol to another,
a loader mechanism for selectively moving a storage media unit between a storage media slot and one of the plurality of data transfer devices, and
a storage unit controller connected to the loader mechanism and to the data transfer device interfaces, wherein the storage unit controller is configured for connection to the host computing environment to receive and decode one or more host commands sent by the host computing environment at the storage unit controller, and for controlling the loader mechanism for selectively moving storage media units from the storage media slot locations to the data transfer devices for data transfer in response to host commands.

72. The digital data storage unit of claim 71, wherein each data transfer device has a unique logical address, and at least one host command comprises a media unit access request including a media unit address generated by the host computing environment and a logical address corresponding to a data storage drive specified by the host computing environment, and wherein the storage unit controller controls the loader mechanism for moving said requested storage media unit from the storage media slot location to the specified data transfer device, wherein the requested media unit address comprises a source address corresponding to a storage media slot location containing the requested media unit.

73. The digital data storage unit of claim 71, further comprising a plurality of device canisters, wherein each data transfer device and a corresponding data transfer device interface are housed in a device canister.

74. The digital data storage unit of claim 71, wherein each data transfer device comprises a media player for writing data to and reading data from a storage media unit.

75. The digital data storage unit of claim 71, wherein at least a number of the data transfer device interfaces are interconnected via at least a communication link, wherein each of said at least a number of data transfer device interfaces includes logic circuitry for selectively routing data to one or more other data transfer devices.

76. The digital data storage unit of claim 71, wherein at least one data transfer device interface selectively transfers data between the host computing environment and selected ones of a plurality of data transfer devices.

77. The digital data storage unit of claim 71, wherein at least one data transfer device interface comprises a switched fabric topology.

78. The digital data storage unit of claim 71 wherein each data transfer device interface includes:

- a host interface for connecting that data transfer device interface to the host computing environment,
- a management interface for connecting that data transfer device interface to the storage unit controller for management communication, and
- a device data interface for connecting that data transfer device interface to a corresponding data transfer device via a device communication link.

79. The digital data storage unit of claim 78, wherein the device data interface in at least one data transfer device interface comprises a fibre channel interface connected to a corresponding data transfer device via said device communication link.

80. The digital data storage unit of claim 78, wherein the device data interface in at least one data transfer device interface comprises a SCSI interface connected to a corresponding data transfer device via said device communication link.

81. The digital data storage unit of claim 78, wherein the device data interface in at least one data transfer device interface comprises an Ethernet interface connected to a corresponding data transfer device via said device communication link.

82. The digital data storage unit of claim 78, wherein the device data interface in at least one data transfer device interface comprises an Infiniband interface connected to a corresponding data transfer via said device communication link.

83. The digital data storage unit of claim 71, further comprising at least one host computer interface module for connecting the digital data storage unit to the host computing environment via at least one communication link, wherein the host computing environment communicates with the storage unit controller via the host computer interface module.

84. The digital data storage unit of claim 78, wherein the host interface in at least one data transfer device interface comprises a fibre channel interface for connecting that data transfer device interface to the host computing environment.

85. The digital data storage unit of claim 78, wherein the host interface in at least one data transfer device interface comprises an Ethernet interface for connecting that data transfer device interface to the host computing environment.

86. The digital data storage unit of claim 78, wherein the host interface in at least one data transfer device interface comprises an Infiniband interface for connecting that data transfer device interface to the host computing environment.

87. The digital data storage unit of claim 78, wherein the management interface in at least one data transfer device interface comprises a fibre channel interface connected to the storage unit controller via a communication link.

88. The digital data storage unit of claim 78, wherein the management interface in at least one data transfer device interface comprises a i2c channel interface connected to the storage unit controller via a communication link.

89. The digital data storage unit of claim 78, wherein the management interface in at least one data transfer device interface comprises a USB interface connected to the storage unit controller via a communication link.

90. The digital data storage unit of claim 78, wherein the management interface in at least one data transfer device interface comprises an Ethernet interface connected to the storage unit controller via a communication link.

91. The digital data storage unit of claim 78, wherein the storage unit controller is further configured for selectively managing configuration of the data transfer device interfaces via the management interface in each data transfer device interface.

92. The digital data storage unit of claim 91, wherein said management configuration of the data transfer device interfaces by the storage unit controller includes selectively configuring data routing by each data transfer device interface to one or more other data transfer device interfaces.

93. The digital data storage unit of claim 91, wherein said management configuration of the data transfer device interfaces by the storage unit controller includes selectively configuring protocol conversion by each data transfer device interface.

* * * * *